United States Patent
Yoo et al.

(10) Patent No.: US 9,182,024 B2
(45) Date of Patent: Nov. 10, 2015

(54) MULTI-STAGE TRANSMISSION

(71) Applicant: MBI Co., Ltd., Cheongwon-gun, Chungcheongbuk-do (KR)

(72) Inventors: Hyuk Yoo, Cheongju-si (KR); Tae-Jin Jung, Cheongju-si (KR); Seong-Cheol An, Cheongju-si (KR)

(73) Assignee: MBI CO., LTD., Cheongwon-Gun, Chungcheongbuk-Do (KR)

( * ) Notice: Subject to any disclaimer, the term of this patent is extended or adjusted under 35 U.S.C. 154(b) by 0 days.

(21) Appl. No.: 13/980,801

(22) PCT Filed: May 31, 2013

(86) PCT No.: PCT/KR2013/004823
§ 371 (c)(1),
(2) Date: Jul. 19, 2013

(87) PCT Pub. No.: WO2014/025130
PCT Pub. Date: Feb. 13, 2014

(65) Prior Publication Data
US 2015/0141196 A1      May 21, 2015

(30) Foreign Application Priority Data
Aug. 9, 2012  (KR) .................. 10-2012-0087145

(51) Int. Cl.
| B62M 11/14 | (2006.01) |
|---|---|
| B62M 11/18 | (2006.01) |
| F16H 37/04 | (2006.01) |
| B62M 11/16 | (2006.01) |
| F16H 61/686 | (2006.01) |
| F16H 63/08 | (2006.01) |

(52) U.S. Cl.
CPC .............. *F16H 37/04* (2013.01); *B62M 11/16* (2013.01); *F16H 61/686* (2013.01); *F16H 63/08* (2013.01); *B62M 11/14* (2013.01); *B62M 11/18* (2013.01); *F16H 2200/0078* (2013.01); *F16H 2200/201* (2013.01); *F16H 2200/2087* (2013.01)

(58) Field of Classification Search
CPC .............................. B62M 11/14; B62M 11/18
See application file for complete search history.

(56) References Cited

U.S. PATENT DOCUMENTS 3,546,970 A * 12/1970 Schwerdhofer ............... 475/259
3,608,683 A *  9/1971 Fujisawa .................... 192/217.4
(Continued)

FOREIGN PATENT DOCUMENTS

JP      2012025336 A  *  2/2012

OTHER PUBLICATIONS

Partial machine translation of JP201225336A, May 4, 2015.*

*Primary Examiner* — Tisha Lewis
(74) *Attorney, Agent, or Firm* — LRK Patent Law Firm

(57) ABSTRACT

A multi-stage transmission having more stages using planetary gear sets and employing a forced return means for achieving smooth shifting in a forward operation by acceleration manipulation and a reverse operation by deceleration manipulation is provided. The multi-stage transmission includes a shaft with both ends fixed, a sprocket for receiving a rotational force and a hub shell for outputting the rotational force; a shifting unit comprising one-way clutches and planetary gear sets, each of planetary gear sets being composed of a sun gear, planetary gears, a carrier and a ring gear provided within the hub shell to change the rotational force input through the sprocket and to output the changed rotational force to the hub shell; and a control unit for controlling shifting by controlling pawls provided on the shaft according to manipulation of a shift lever to selectively restrict rotation of the sun gear.

26 Claims, 12 Drawing Sheets

(56) References Cited

U.S. PATENT DOCUMENTS

| | | | |
|---|---|---|---|
| 3,648,809 A * | 3/1972 | Schwerdhofer | 192/217.4 |
| 5,562,563 A * | 10/1996 | Shoge | 475/298 |
| 2009/0023542 A1 * | 1/2009 | Hino | 475/318 |
| 2009/0203490 A1 * | 8/2009 | Fukui et al. | 475/297 |

* cited by examiner

MULTI-STAGE TRANSMISSION

TECHNICAL FIELD

The present invention relates to a multi-stage transmission, and more particularly, to a compact multi-stage transmission that is implemented to have more stages by using planetary gear sets and employs a forced return means for achieving smooth shifting in both a forward operation by acceleration manipulation and a reverse operation by deceleration manipulation, thereby improving product marketability and maximizing use convenience.

BACKGROUND ART

Generally, a bicycle, a wheelchair, a handcart or the like, which has wheels and travels using various kinds of driving forces such as man power or an electromotive force, is provided with a transmission for changing a traveling speed.

Such a transmission performs shifting in multiple stages from a high speed to a low speed according to manipulation of a rider or user to obtain torque or speed required under a traveling condition.

In particular, recently, a planetary gear set consisting of a sun gear, planetary gears, a ring gear and a carrier is provided in a hub shell to achieve a compact configuration, thereby performing shifting in multiple stages and preventing the gears from being exposed to the outside.

However, there are technical problems in that a conventional multi-stage transmission using a planetary gear set has a small number of shifting stages in spite of a complicated structure, and in particular, a pawl that has been engaged with an inner peripheral surface of the sun gear to restrict rotation of the sun gear is not disengaged during shifting manipulation, resulting in unsmooth shifting.

DISCLOSURE

Technical Problem

The present invention is conceived to solve the above problems and thus intends to provide a multi-stage transmission that is configured to be compact using a planetary gear set so as to improve product marketability and employs a forced return means for achieving smooth shifting in both a forward operation by acceleration manipulation and a reverse operation by deceleration manipulation so as to maximize use convenience of a user.

Technical Solution

The present invention provides a multi-stage transmission comprising: a shaft with both ends fixed, and a sprocket for receiving a rotational force and a hub shell for outputting the rotational force, wherein the sprocket and the hub shell are rotatably located on an outer periphery of the shaft; a shifting unit comprising one-way clutches and planetary gear sets each of which is composed of a sun gear, planetary gears, a carrier and a ring gear provided within the hub shell to change the rotational force input through the sprocket and to output the changed rotational force to the hub shell; and a control unit for controlling shifting by controlling pawls provided on the shaft according to manipulation of a shift lever to selectively restrict rotation of the sun gear wherein the manipulation for rotating the shift lever generates a displacement of a drive pawl clutch in an axial direction of the shaft, so that the rotational force is selectively transferred with intervention of drive pawls between a rotatable driver and the non-rotatable drive pawl clutch, thereby achieving the shifting.

And, it is preferred that the multi-stage transmission further includes a first forced return means capable of selectively controlling the pawls in engaged states into forced disengaged states and a second forced return means consisting of a drive pawl clutch and a rotation limiting ring and capable of selectively controlling a drive pawl into a forced disengaged state, by using the rotational force input into the sprocket according to conditions of rotational manipulation of the shift lever and the engagement of the pawls.

Moreover, it is most preferable that the control unit has one or more control rings for controlling the pawls, wherein the control rings are stacked in the axial direction of the shaft to be rotated integrally, and one or more pawls are selectively controlled to be in an engaged state or disengaged state, thereby controlling shifting.

Advantageous Effects

The present invention is a novel invention by which a multi-stage transmission can be configured to be compact using a planetary gear set so as to improve product marketability and can employ a forced return means for achieving smooth shifting in both a forward operation by acceleration manipulation and a reverse operation by deceleration manipulation so as to maximize use convenience of a user.

DESCRIPTION OF THE EMBODIMENT

Figure 1:
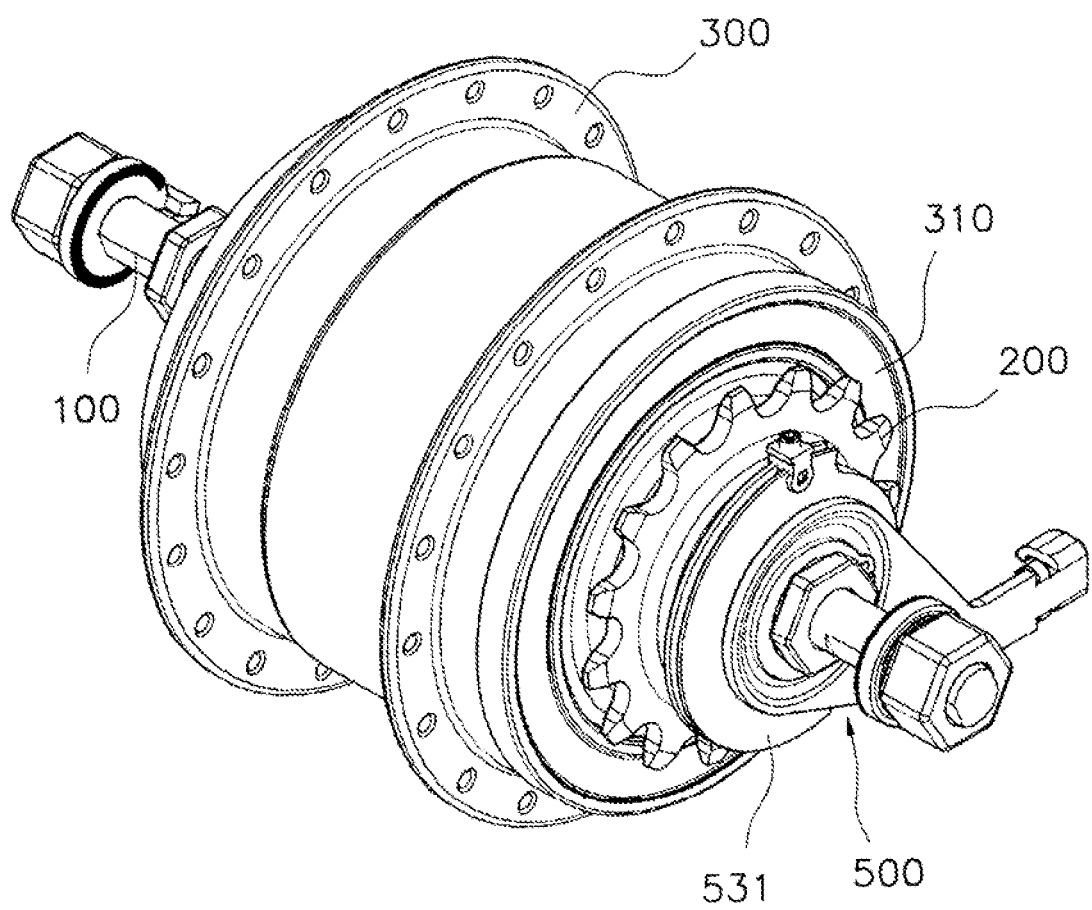
FIG. 1 is a perspective view showing a multi-stage transmission according to the present invention.
Figure 2:
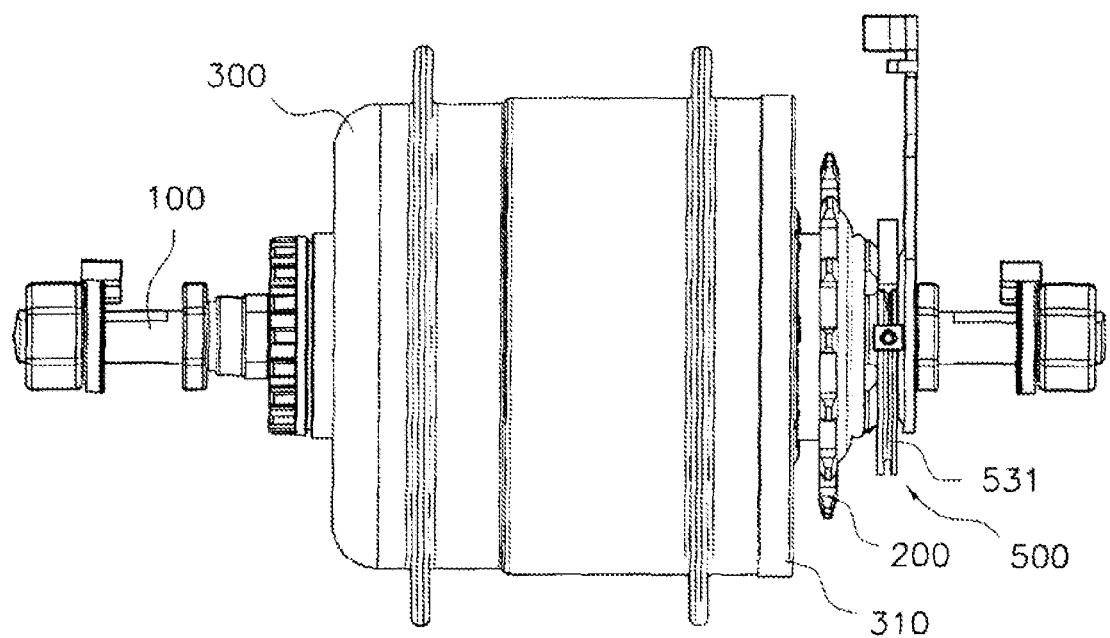
FIG. 2 is a front view showing the multi-stage transmission according to the present invention.

FIG. 1 is a perspective view showing a multi-stage transmission according to the present invention, and FIG. 2 is a front view showing the multi-stage transmission according to the present invention.

Figure 3:
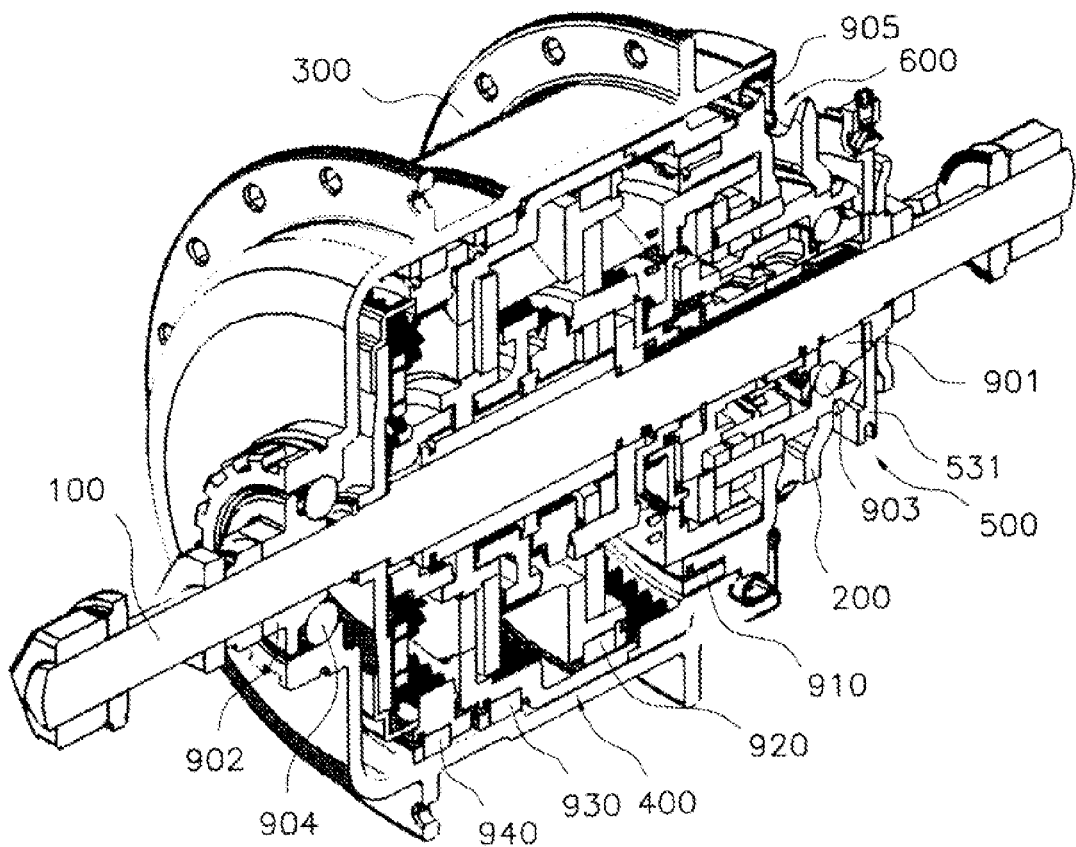
FIG. 3 is a partially cut-away perspective view showing the multi-stage transmission according to the present invention.
Figure 4:
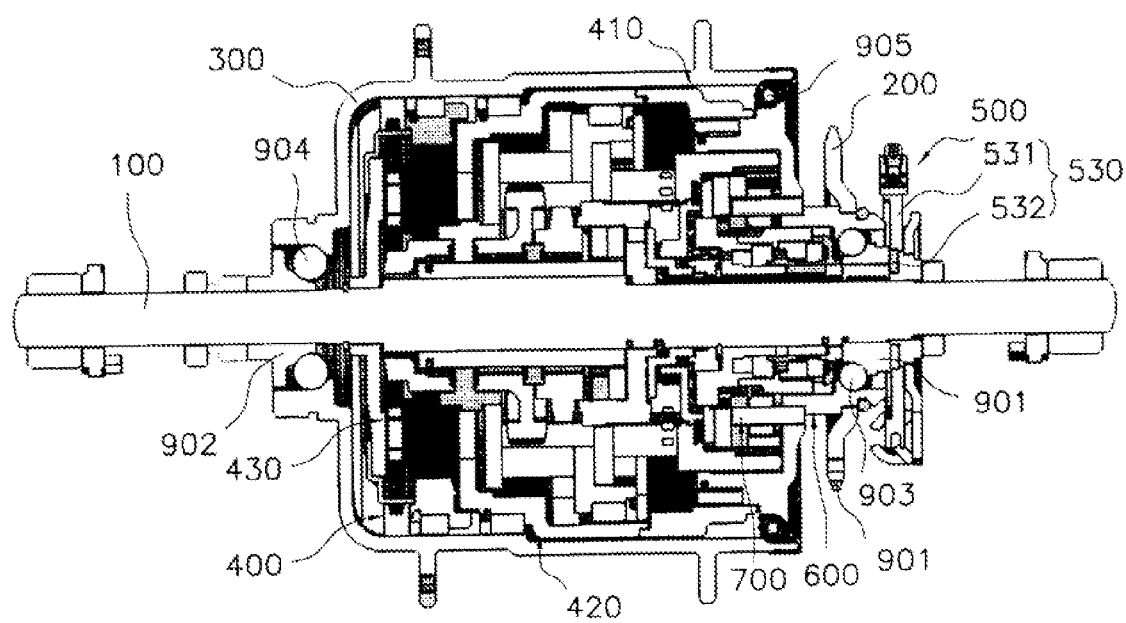
FIG. 4 is a front sectional view showing the multi-stage transmission according to the present invention.

FIG. 3 is a partially cut-away perspective view showing the multi-stage transmission according to the present invention, and FIG. 4 is a front sectional view showing the multi-stage transmission according to the present invention.

Figure 5:
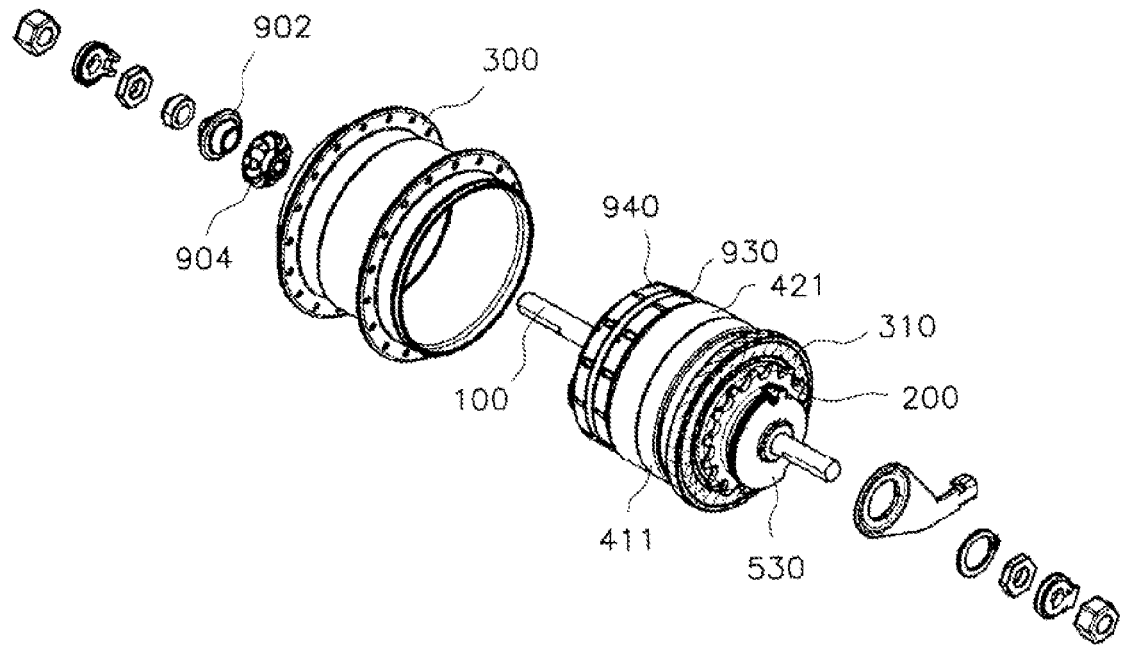
FIG. 5 is an exploded perspective view showing a hub shell of the multi-stage transmission according to the present invention.
Figure 6:
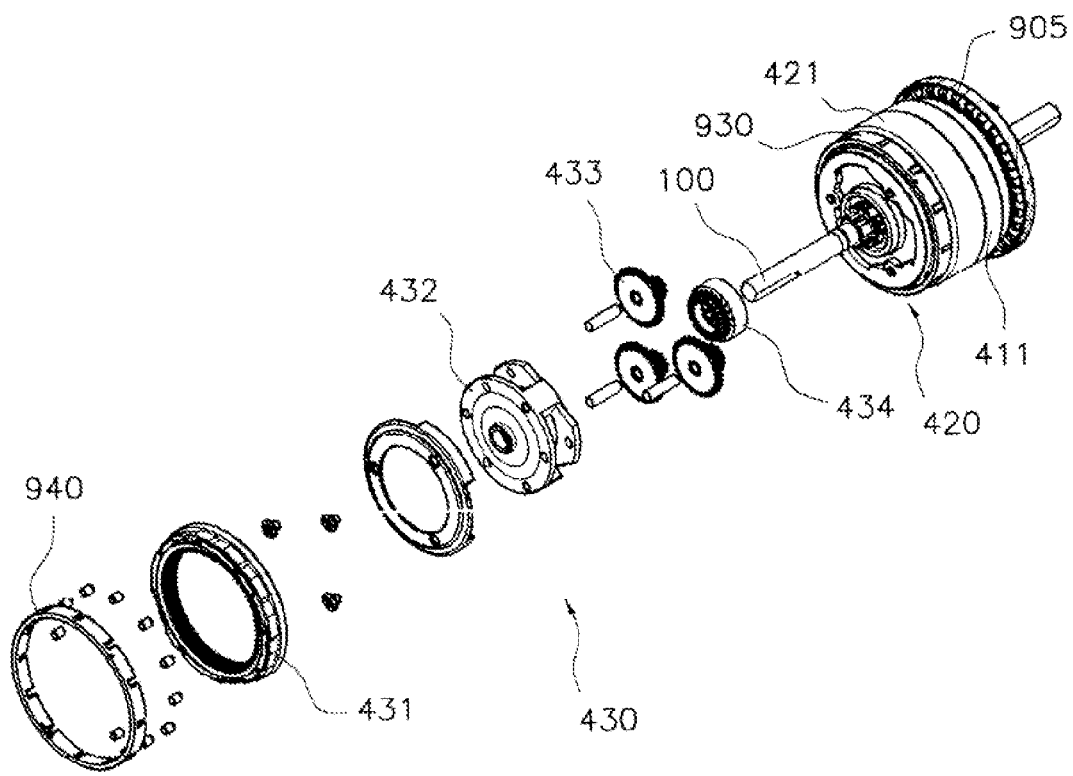
FIG. 6 is an exploded perspective view showing a third-speed planetary gear set of the multi-stage transmission according to the present invention.
Figure 7:
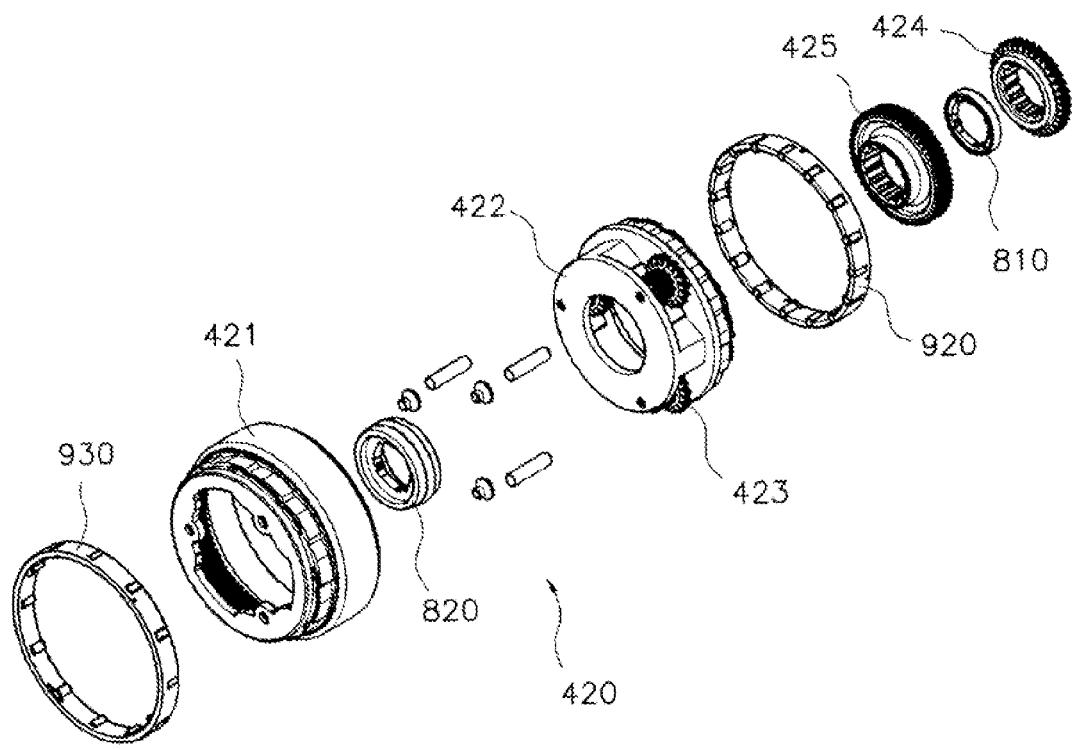
FIG. 7 is an exploded perspective view showing a second-speed planetary gear set of the multi-stage transmission according to the present invention.

FIG. 5 is an exploded perspective view showing a hub shell of the multi-stage transmission according to the present invention, FIG. 6 is an exploded perspective view showing a third-speed planetary gear set of the multi-stage transmission according to the present invention, and FIG. 7 is an exploded perspective view showing a second-speed planetary gear set of the multi-stage transmission according to the present invention.

Figure 8:
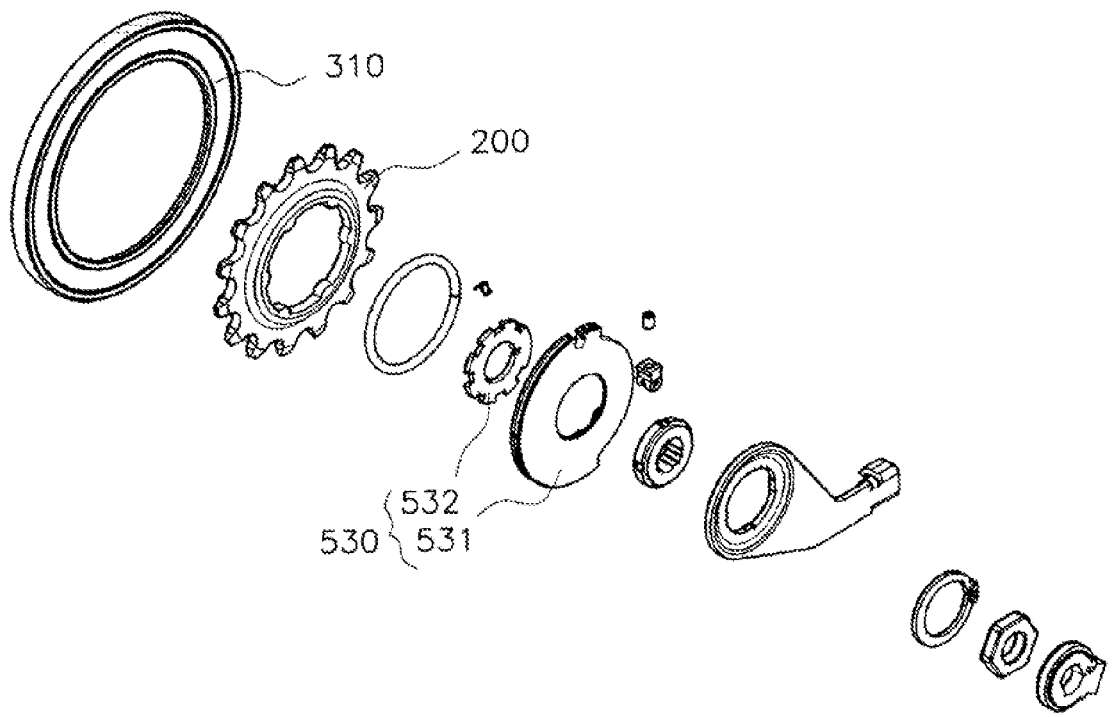
FIG. 8 is an exploded perspective view showing a sprocket of the multi-stage transmission according to the present invention.
Figure 9:
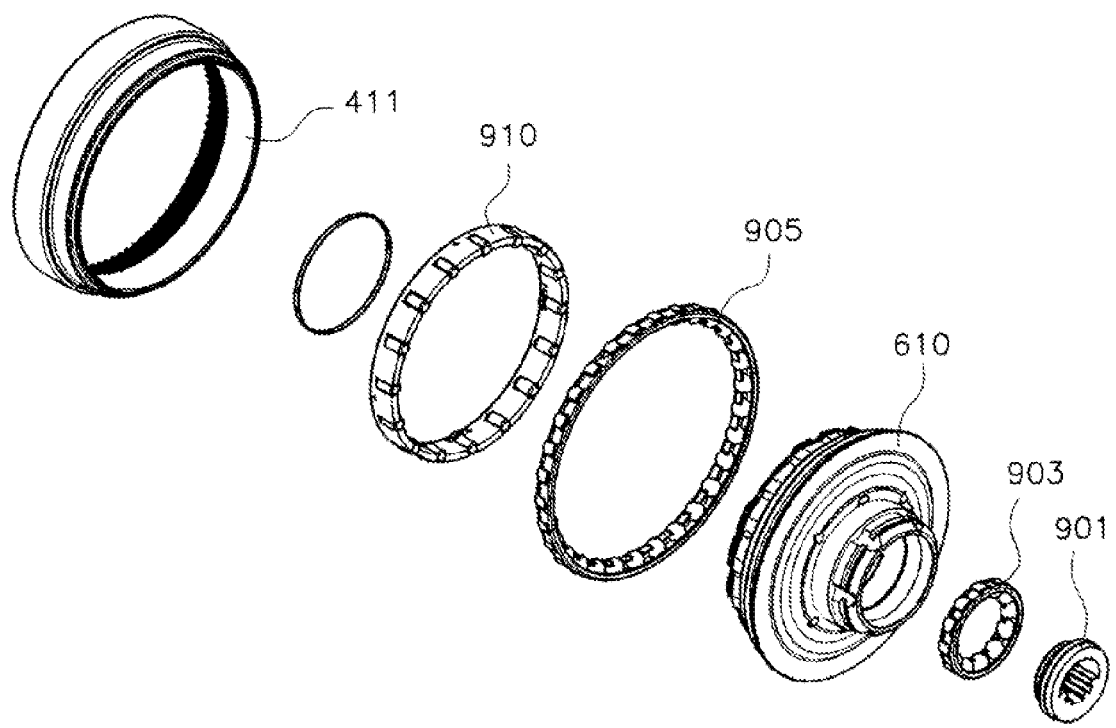
FIG. 9 is an exploded perspective view showing a driver of the multi-stage transmission according to the present invention.

FIG. 8 is an exploded perspective view showing a sprocket of the multi-stage transmission according to the present invention, and FIG. 9 is an exploded perspective view showing a driver of the multi-stage transmission according to the present invention.

Figure 10:
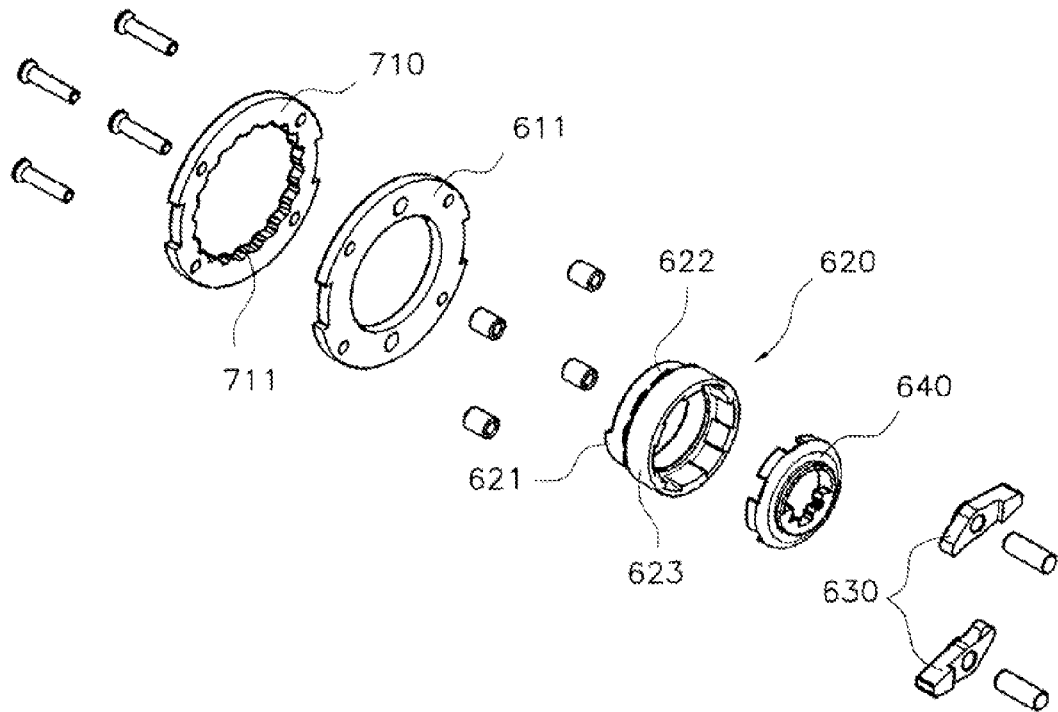
FIG. 10 is an exploded perspective view showing a drive pawl clutch of the multi-stage transmission according to the present invention.
Figure 11:
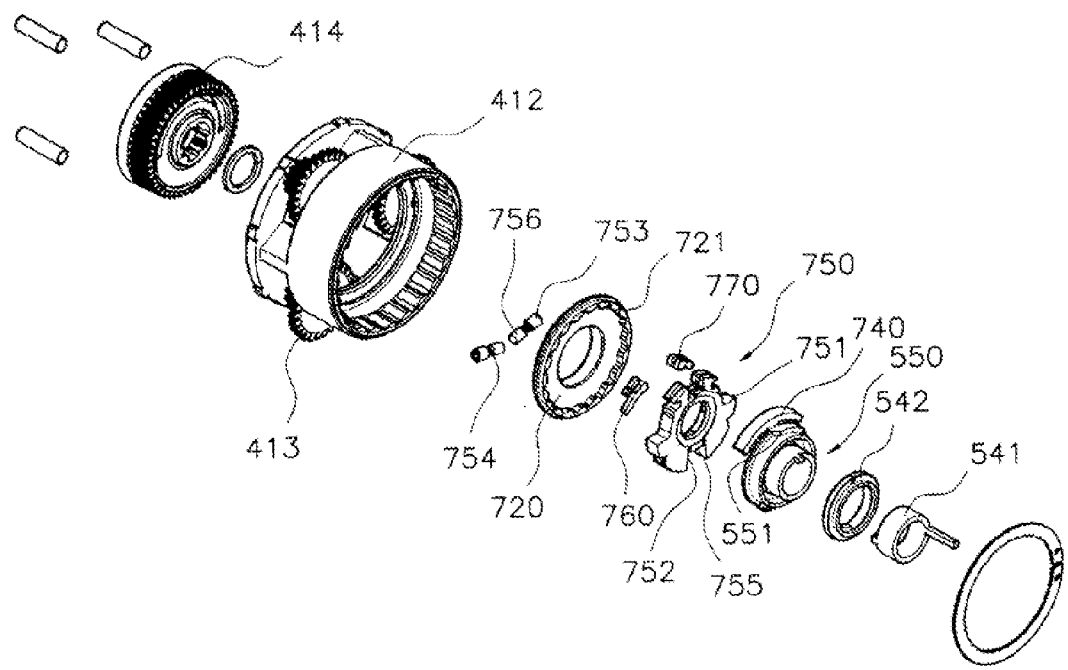
FIG. 11 is an exploded perspective view showing a first-speed planetary gear set of the multi-stage transmission according to the present invention.

FIG. 10 is an exploded perspective view showing a drive pawl clutch of the multi-stage transmission according to the present invention, and FIG. 11 is an exploded perspective view showing a first-speed planetary gear set of the multi-stage transmission according to the present invention.

Figure 12:
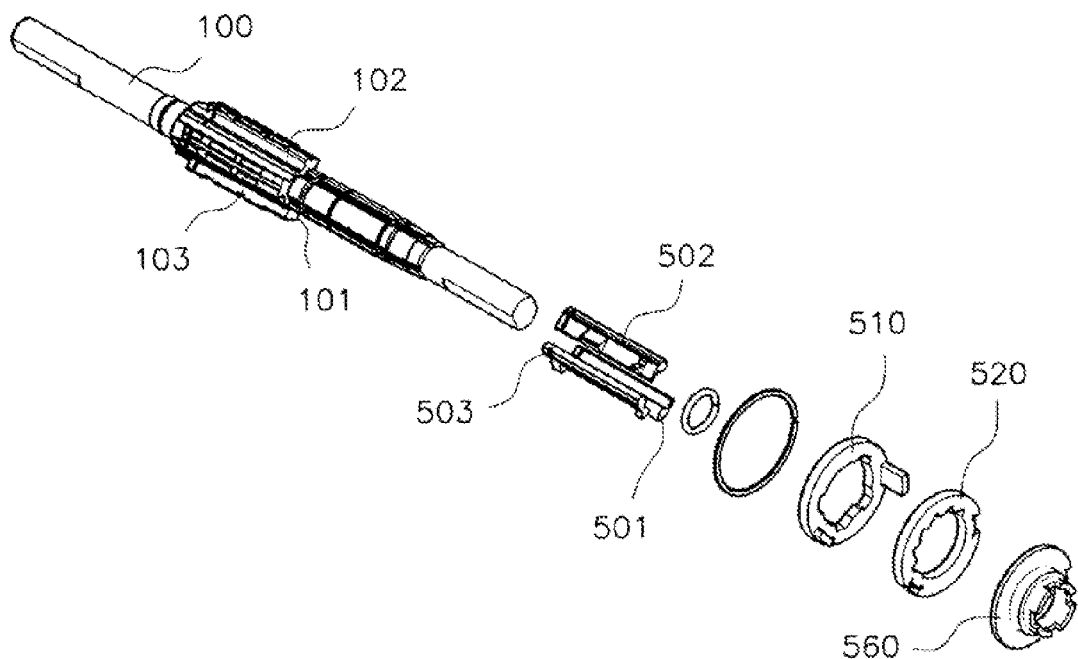
FIG. 12 is an exploded perspective view showing pawls of the multi-stage transmission according to the present invention.
Figure 13:
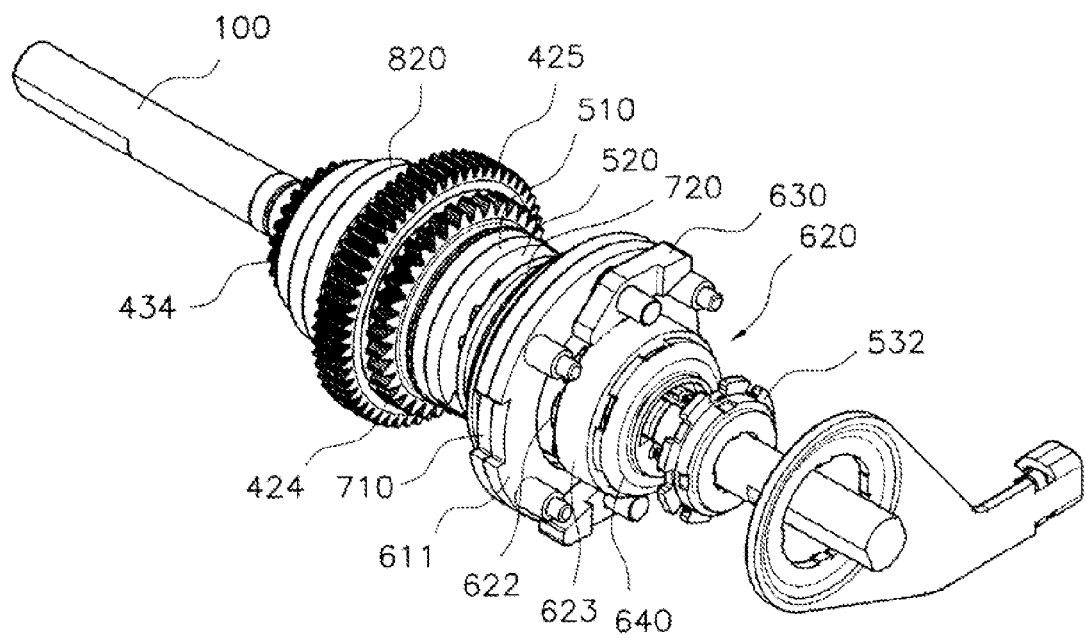
FIG. 13 is a perspective view showing a control unit of the multi-stage transmission according to the present invention.

FIG. 12 is an exploded perspective view showing pawls of the multi-stage transmission according to the present invention, and FIG. 13 is a perspective view showing a control unit of the multi-stage transmission according to the present invention.

Figure 14:
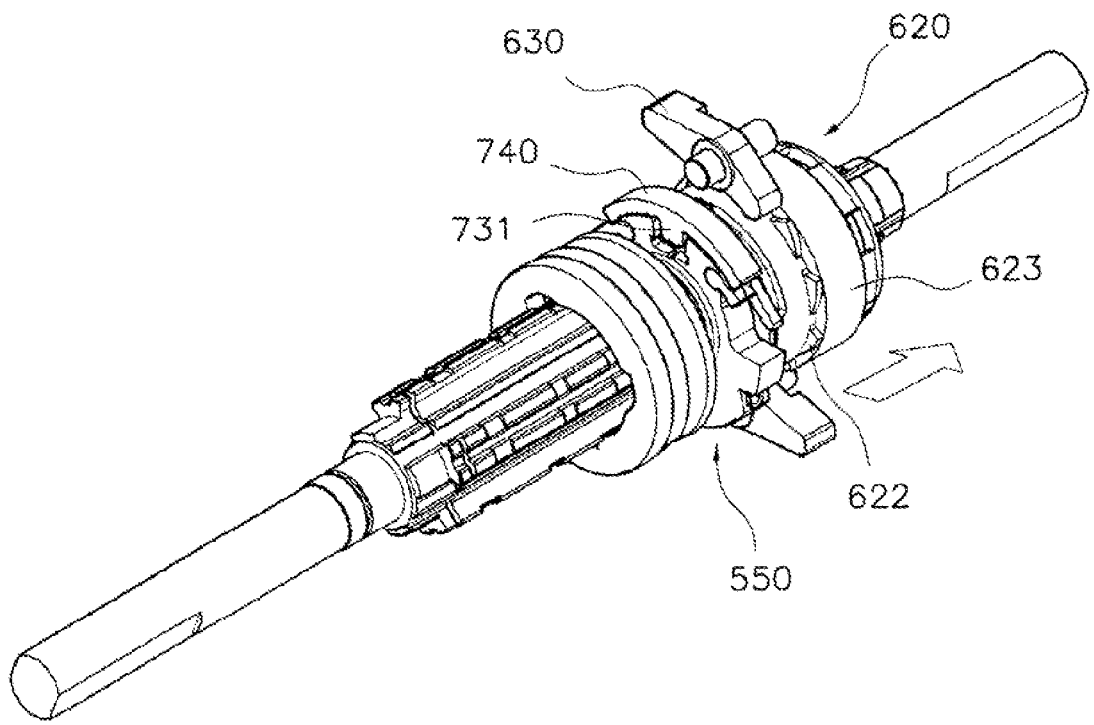
FIG. 14 is a diagram showing an engaged state of the drive pawl in the multi-stage transmission according to the present invention.
Figure 15:
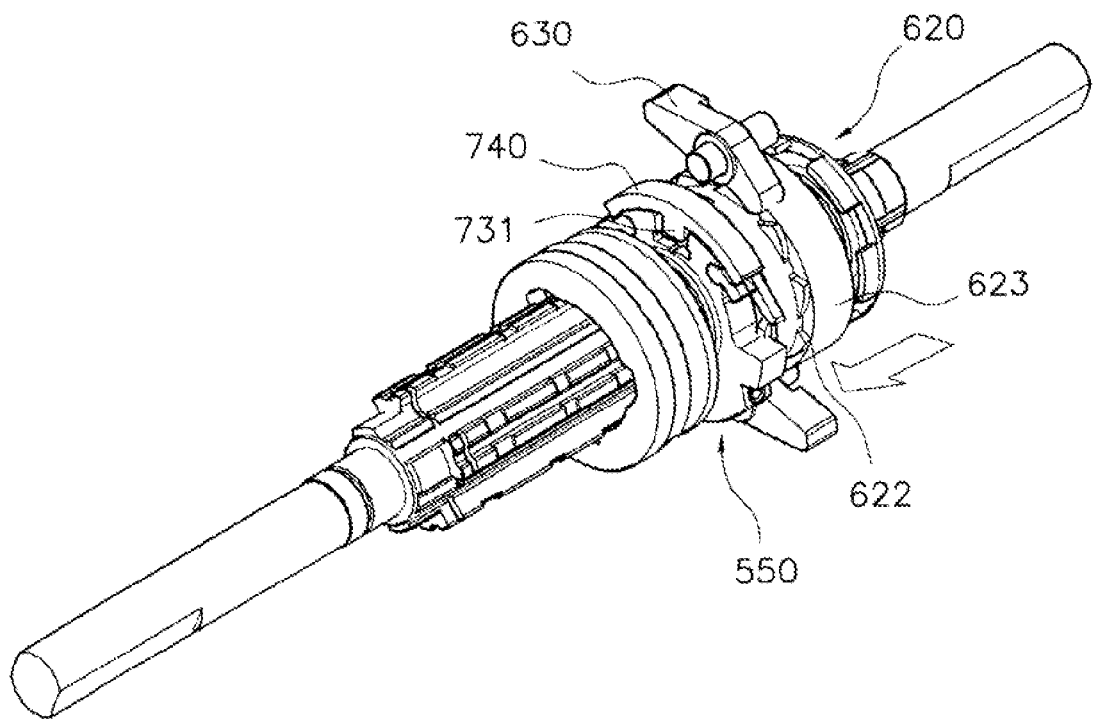
FIG. 15 is a diagram showing a disengaged state of the drive pawl in the multi-stage transmission according to the present invention.

FIG. 14 is a diagram showing an engaged state of the drive pawl in the multi-stage transmission according to the present invention, and FIG. 15 is a diagram showing a disengaged state of the drive pawl in the multi-stage transmission according to the present invention.

Figure 16:
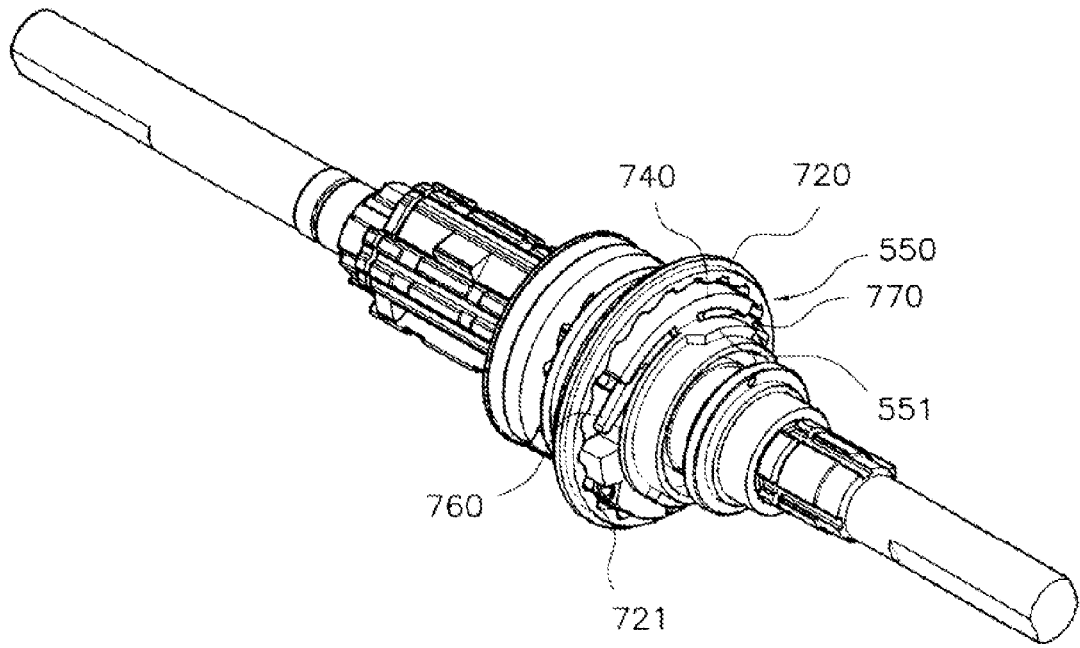
FIG. 16 is a view showing a reverse operation of a first forced return means in the multi-stage transmission according to the present invention.
Figure 17:
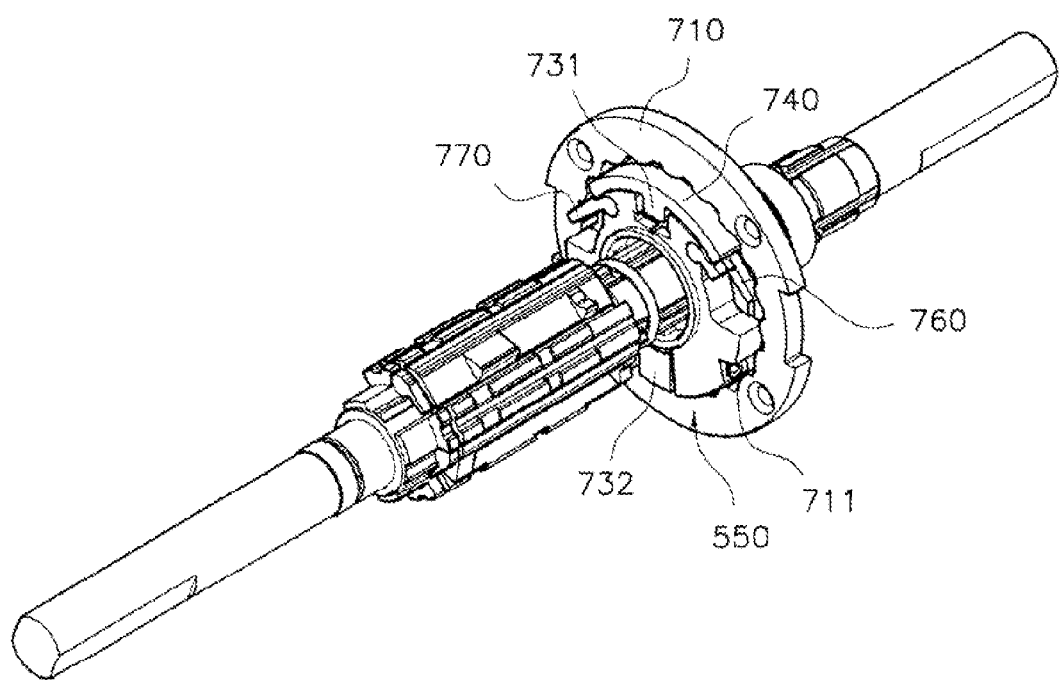
FIG. 17 is a view showing a forward operation of the first forced return means in the multi-stage transmission according to the present invention.

FIG. 16 is a view showing a reverse operation of a first forced return means in the multi-stage transmission according to the present invention, and FIG. 17 is a view showing a forward operation of the first forced return means in the multi-stage transmission according to the present invention.

Figure 18:
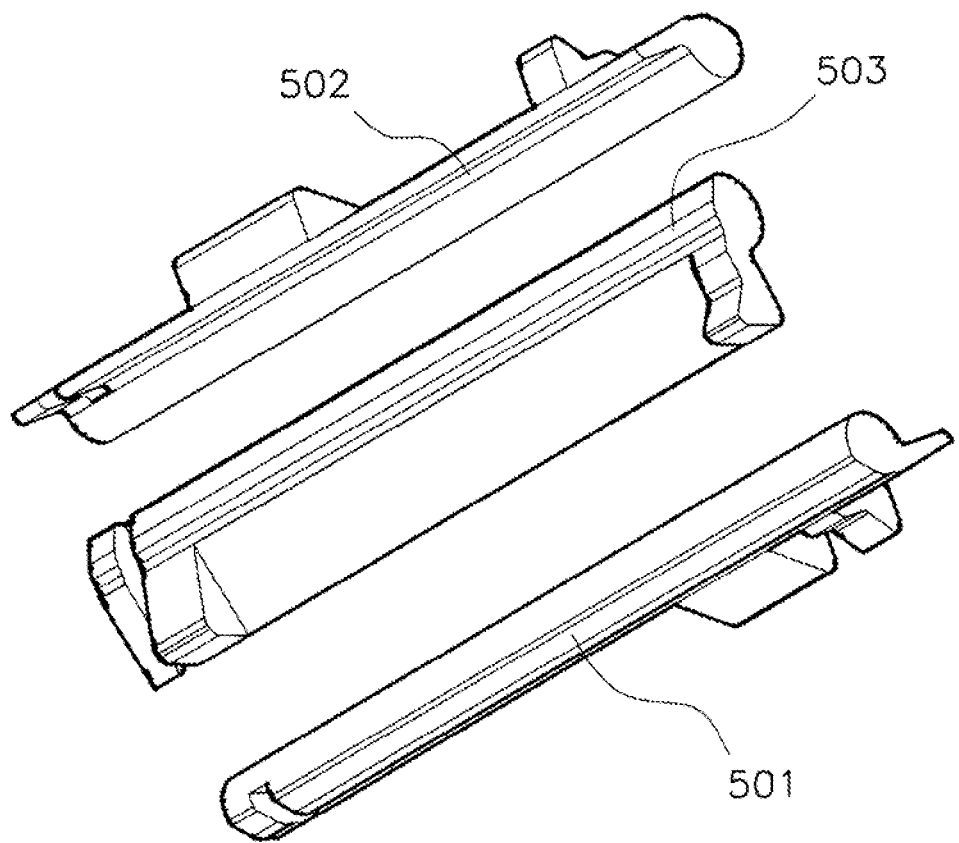
FIG. 18 is a perspective view showing the pawl in the multi-stage transmission according to the present invention.
Figure 19:
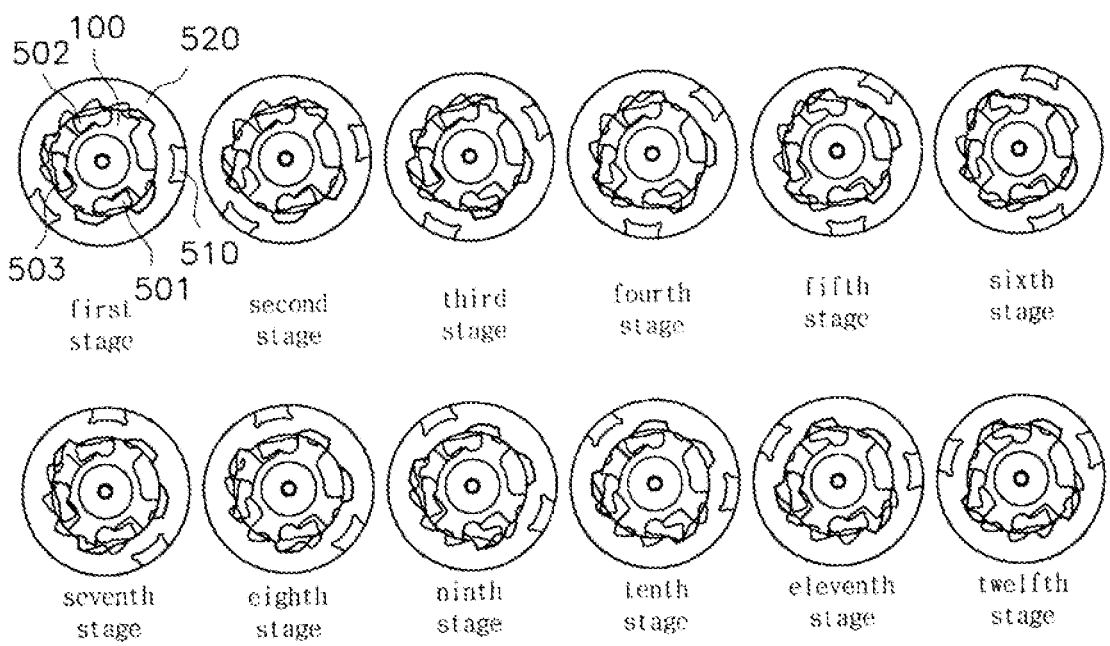
FIG. 19 is a diagram showing the control of the pawl of the multi-stage transmission according to the present invention.
Figure 20:
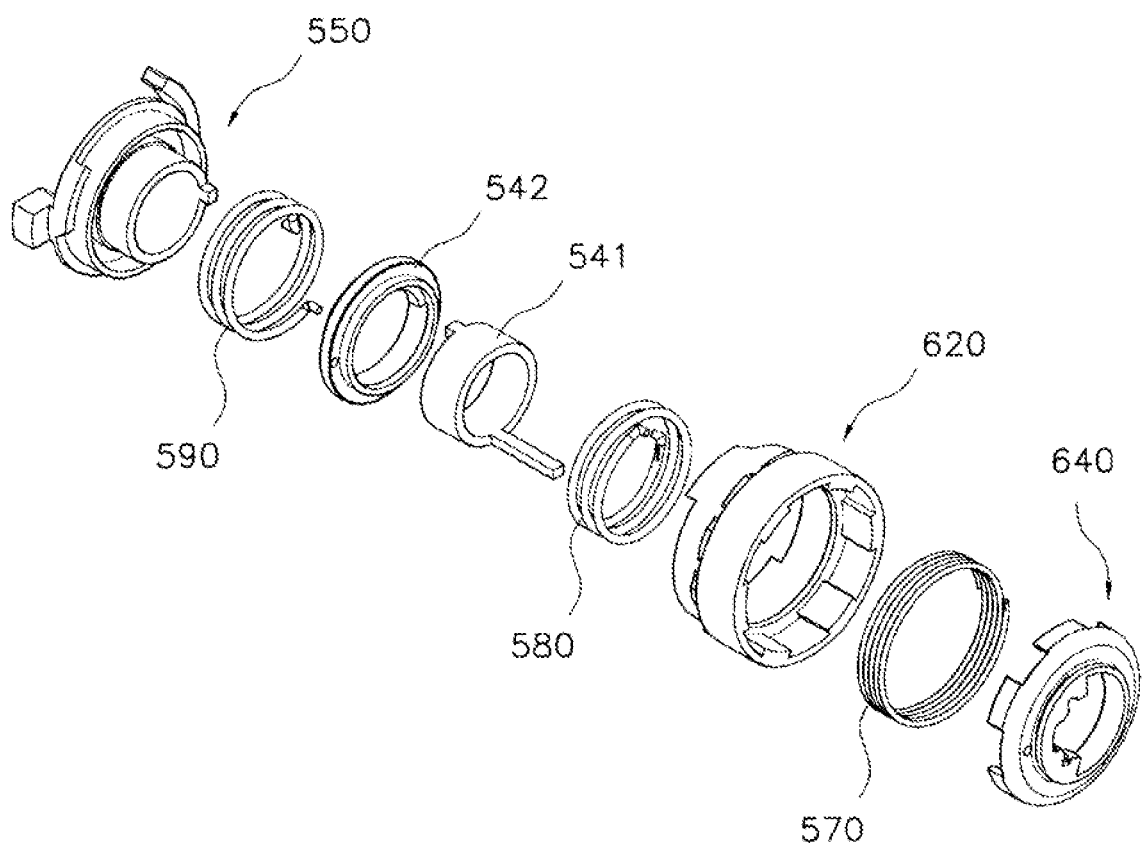
FIG. 20 is an exploded perspective view showing the arrangement of springs provided within the first forced return means in the multi-stage transmission according to the present invention.

FIG. 18 is a perspective view showing the pawl in the multi-stage transmission according to the present invention, FIG. 19 is a diagram showing the control of the pawl of the multi-stage transmission according to the present invention, and FIG. 20 is an exploded perspective view showing the arrangement of springs provided within the first forced return means in the multi-stage transmission according to the present invention.

In the multi-stage transmission of the present invention, control rings are stacked to control a plurality of pawls, thereby implementing multi-stage shifting by means of planetary gear sets. In addition to the planetary gear sets, a drive pawl clutch and a drive pawl are provided to double the number of shifting stages configured by the planetary gear sets. In particular, a forced return means is provided to forcibly release a pawl that is strongly engaged with a sun gear and does not come out therefrom. The technical spirit of the present invention is to achieve smoother shifting in such a manner.

An embodiment of the present invention will be described below in detail with reference to the accompanying drawings.

The multi-stage transmission of the present invention includes a shaft 100 with both ends fixed; and a sprocket 200 for receiving a rotational force and a hub shell 300 for outputting the rotational force, wherein the sprocket 200 and the hub shell 300 are rotatably located on an outer periphery of the shaft 100; a shifting unit 400 including one-way clutches and planetary gear sets each of which is composed of a sun gear, planetary gears, a carrier and a ring gear provided within the hub shell 300 to change the rotational force input through the sprocket 200 and to output the changed rotational force to the hub shell 300; and a control unit 500 for controlling shifting by controlling pawls provided on the shaft 100 according to manipulation of a shift lever to selectively restrict rotation of the sun gear. Wherein the manipulation for rotating the shift lever generates a displacement of a drive pawl clutch 620 in an axial direction of the shaft 100, so that the rotational force is selectively transferred with intervention of drive pawls 630 between a rotatable driver 610 and the non-rotatable drive pawl clutch 620, thereby achieving the shifting.

First, the multi-stage transmission of the present invention roughly includes the shaft 100, the sprocket 200, the hub shell 300, the shifting unit 400 and the control unit 500, as shown in FIGS. 1 to 4.

Both ends of the shaft 100 are fixedly and non-rotatably supported, with a fastening means such as a fastening nut, by the body of a scooter, a bicycle, a rickshaw or the like (hereinafter, referred to as a "traveling apparatus") that requires shifting.

And, the shaft 100 has different diameters at respective portions thereof. In particular, at the outer periphery of a middle portion of the shaft 100, a plurality of pawl seating portions 101, 102 and 103 are concavely formed with predetermined phase angle differences so that the pawls as will be described later can be placed therein.

This shaft 100 constructs the backbone of the present invention, and all components described later are rotatably or non-rotatably provided on the outer periphery of the shaft 100.

Next, the sprocket 200 allows the multi-stage transmission of the present invention to receive the rotational force such as man power or an electromotive force from the traveling apparatus and is rotatably provided on one side of the shaft 100.

Accordingly, the sprocket 200 receives the driving force, for example, through a power transmission means such as a chain.

Moreover, the hub shell 300 is positioned on the outermost side of the shaft 100 and configured to output a changed driven force to wheels or the like of the traveling apparatus.

The hub shell 300 has a generally hollow cylindrical shape, and one end thereof is closed but the other end thereof is open so that various components can be inserted through the open end and assembled therein.

The closed end of the hub shell 300 is provided with a cone nut 902 and a bearing 904 coupled to the shaft 100, so that the hub shell 300 is supported to be rotatable independent of the shaft 100.

Next, the shifting unit 400 is positioned within the hub shell 300 to change the rotational force input through the sprocket 200 in multiple stages and to output the changed rotational force through the hub shell 300. The shifting unit 400 includes a plurality of planetary gear sets and a plurality of one-way clutches.

In this embodiment, a description will be made by way of example in connection with three planetary gear sets, i.e., a first-speed planetary gear set 410, a second-speed planetary gear set 420 and a third-speed planetary gear set 430.

In other words, the shifting unit 400 consists of the first-speed planetary gear set 410, the second-speed planetary gear set 420 and the third-speed planetary gear set 430 and transfers the rotational force, which is transmitted from the drive unit 600 to the first-speed carrier 412 or the first-speed ring gear 411, to a second-speed carrier 422 via the first-speed planetary gear set 410. The rotational force transferred to the second-speed carrier 422 can be changed in six stages through the second-speed planetary gear set 420 and the third-speed planetary gear set 430, and the changed rotational force can be output to the hub shell 300.

Each of the planetary gear sets includes a ring gear, a carrier, planetary gears and a sun gear. The planetary gears are formed in two stages of different diameters, i.e., a larger-diameter stage and a smaller-diameter stage, and are rotatably supported by the carrier. The ring gear is provided on the outer side of the carrier, and the sun gear is located on the inner side of the carrier.

Accordingly, shifting such as acceleration or deceleration is achieved by receiving the rotational force through the ring gear or the carrier and outputting the rotational force through the planetary gears to the carrier or the ring gear.

Therefore, the first-speed planetary gear set 410 includes a first-speed ring gear 411, a first-speed carrier 412, first-speed planetary gears 413 and a first-speed sun gear 414, as shown in FIGS. 9 and 11.

And, the first-speed sun gear 414 always remains in a fixed state without rotation due to a coupling groove formed in an inner peripheral surface thereof and engaged with the outer peripheral surface of the shaft 100, rather than the restriction of rotation by the pawls.

Furthermore, the third-speed planetary gear set 430 consists of a third-speed ring gear 431, a third-speed carrier 432, third-speed planetary gears 433 and a third-speed sun gear 434, as shown in FIG. 6.

In particular, the second-speed planetary gear set 420 is provided with two sun gears, as shown in FIG. 7, and thus consists of a second-speed ring gear 421, a second-speed carrier 422, second-speed planetary gears 423, a second-speed first sun gear 424 and a second-speed second sun gear 425.

In other words, an outer peripheral surface of the second-speed first sun gear 424 of the second-speed planetary gear set 420 is engaged with larger-diameter portions of the second-speed planetary gears 423 formed in two stages, and an outer peripheral surface of the second-speed second sun gear 425 is engaged with smaller-diameter portions of the second-speed planetary gears 423.

Accordingly, in the present invention, when a second-speed first pawl 501, a second-speed second pawl 502 and a third-speed pawl 503 are raised into inner teeth formed in inner peripheral surfaces of the second-speed first sun gear 424, the second-speed second sun gear 425 and the third-speed sun gear 434, respectively, the rotation of the sun gears is selectively restricted by means of the engagement.

And, the control for raising or laying down the second-speed first pawl 501, the second-speed second pawl 502 and the third-speed pawl 503 will be described in detail later.

Therefore, in the present invention, a gear ratio of each of the planetary gear sets is changed depending on whether the sun gears can rotate or not, thereby achieving shifting.

And, the first-speed carrier 412 of the first-speed planetary gear set 410 and the second-speed carrier 422 of the second-speed planetary gear set 420 are directly coupled to each other and thus rotated integrally, and the second-speed ring gear 421 of the second-speed planetary gear set 420 and the third-speed carrier 432 of the third-speed planetary gear set 430 are directly coupled to each other and thus rotated integrally.

Accordingly, while the driving force transmitted to the shifting unit 400 is transferred from the first-speed planetary gear set 410 to the third-speed planetary gear set 430 via the second-speed planetary gear set 420, multi-stage shifting is achieved and the driving force is then output through the hub shell 300.

In addition, the plurality of one-way clutches are provided within the shifting unit 400, so that if a rotational speed of a component located inside the one-way clutch is higher than that of another component located outside the one-way clutch, the rotational force of the component located inside the one-way clutch is transferred to the other component located outside the one-way clutch.

On the contrary, if the rotation speed of the component located inside the one-way clutch is lower than that of the other component located outside the one-way clutch, the rotational force of the component located inside the one-way clutch is not transferred to the other component located outside the one-way clutch.

In this embodiment, four one-way clutches configured as above are provided as shown in FIG. 3.

In other words, a first one-way clutch 910 is provided between an outer peripheral surface of the driver 610 of the drive unit 600 as will be described later and an inner peripheral surface of the first-speed ring gear 411 of the first-speed planetary gear set 410 provided in the shifting unit 400, and a second one-way clutch 920 is provided between an outer peripheral surface of the second-speed carrier 422 of the second-speed planetary gear set 420 provided in the shifting unit 400 and an inner peripheral surface of the second-speed ring gear 421.

In addition, a third one-way clutch 930 is provided between an outer peripheral surface of the second-speed ring gear 421 of the second-speed planetary gear set 420 provided in the shifting unit 400 and an inner peripheral surface of the hub shell 300, and a fourth one-way clutch 940 is provided between an outer peripheral surface of the third-speed ring gear 431 of the third-speed planetary gear set 430 provided in the shifting unit 400 and the inner peripheral surface of the hub shell 300.

Accordingly, a final rotational force that has been subjected to shifting is output to the hub shell 300 only through the third one-way clutch 930 or the fourth one-way clutch 940.

Finally, the control unit 500 for controlling the shifting unit 400 includes three pawls: the second-speed first pawl 501, the second-speed second pawl 502 and the third-speed pawl 503 to be located in the pawl seating portions 101, 102 and 103 of the shaft 100 respectively, as shown in FIG. 18 and these pawls are located to be resiliently raised by means of ring springs.

In particular, in the control unit 500 of the present invention, one or more control rings for controlling the pawls are stacked in the axial direction of the shaft 100 to be rotated integrally, as shown in FIG. 12. And, it is preferable that one or more pawls are selectively controlled to be in an engaged state or disengaged state, thereby controlling shifting.

In other words, each of the pawls has a control portion and a catching portion protrudingly formed at different intervals. First, for each of the second-speed first pawl 501 and the second-speed second pawl 502, as shown in FIG. 18, the control portion is formed to be spaced apart by a predetermined distance from the right end in the figure, and the catching portion is formed again to be spaced apart from the control portion.

At this time, the control portion and the catching portion in the second-speed first pawl 501 are adjacent to each other, whereas the control portion and the catching portion in the second-speed second pawl 502 are further spaced apart from each other as compared with those of the second-speed first pawl 501.

In addition, the third-speed pawl 503 has a control portion at the right end and a catching portion at the left end in the figure, and therefore the control portion and the catching portion are spaced farthest from each other.

That is, control rings are to be located at the control portion formed at each of the pawls, and the sun gears are to be located at the respective catching portions.

In addition, in the present invention, a second-speed control ring 510 and a third-speed control ring 520 that are rotated in an interlocked manner according to the rotation of the shift lever are stacked along the axial direction of the shaft 100 and on outer peripheries of the second-speed first pawl 501, the second-speed second pawl 502 and the third-speed pawl 503. Preferably, grooves are formed in an inner peripheral surface of the second-speed control ring 510 so that the second-speed first pawl 501 and the second-speed second pawl 502 can selectively come into the grooves according to the rotation of the second-speed control ring 510; and grooves are formed in an inner peripheral surface of the third-speed control ring 520 so that the third-speed pawl 503 can selectively come into the grooves according to the rotation of the third-speed control ring 520.

In other words, a difference in the distances of the respective control portions of the second-speed first pawl 501 and the second-speed second pawl 502 from the right end in the figure corresponds to the thickness of the third-speed control ring 520.

Accordingly, when the control portion of the pawl that will be elastically raised depending on rotation angles of the second-speed control ring 510 and the third-speed control ring 520 is located in the groove, the catching portion of the pawl is raised and engaged with inner teeth formed in the inner peripheral surface of the sun gear, thereby restricting the rotation of the sun gear.

In particular, a plurality of grooves are formed in the second-speed control ring 510 about a central axis of the shaft 100 in pairs corresponding to the second-speed first pawl 501 and the second-speed second pawl 502; and a plurality of grooves are formed in the third-speed control ring 520 about the central axis of the shaft 100 corresponding to the third-speed pawl 503.

At this time, for the grooves formed in the second-speed control ring 510, engaged and disengaged states of the third-speed pawl 503 are switched whenever the third-speed control ring 520 rotates by 15 degrees, and the second-speed first pawl 501 and the second-speed second pawl 502 that have come into the grooves of the second-speed control ring 510 get out of the grooves after rotation through 30 degrees.

Hereinafter, how shifting manipulation is transferred to the second-speed control ring 510 and the third-speed control ring 520 described above will be discussed below.

In the present invention, the control unit 500 preferably includes a cable ring 530 rotatably supported on the outer peripheral surface of the shaft 100 and having a cable connected thereto that is withdrawn according to the manipulation of the shift lever; a joint ring 550 for receiving a manipulation force elastically through a spring 590 via a connection ring 541 connected to the cable ring 530 and an angle control ring 542 fitted into and operated integrally with the connection ring 541; and an engagement ring 560 engaged and rotated integrally with the joint ring 550 and coupled to the third-speed control ring 520 so as to rotate the second-speed control ring 510 and the third-speed control ring 520.

And, the cable ring 530 includes an outer cable ring 531 having the cable connected thereto, and an inner cable ring 532 engaged with an inner peripheral surface of the outer cable ring 531 and rotatably supported on the shaft 100, as shown in FIG. 8.

Thereafter, the manipulation force is transferred to the joint ring 550 through the connection ring 541 and the angle control ring 542, as shown in FIG. 11. Here, the connection ring 541 is formed with a protrusion so as to be engaged and rotated integrally with the angle control ring 542.

And, the spring 590 is connected between the angle control ring 542 and the joint ring 550, as shown in FIG. 20, so that the manipulation force is transferred from the angle control ring 542 to the joint ring 550 through the spring 590.

Controlled states of the second-speed first pawl 501, the second-speed second pawl 502 and the third-speed pawl 503 according to control angles of the second-speed control ring 510 and the third-speed control ring 520 are shown in FIG. 19, and are summarized in the following table.

Table I below also shows whether the one-way clutches transferred a rotational force in accordance with the operation of each of the pawls.

TABLE 1

| Stage | Second-speed first pawl | Second-speed second pawl | Third-speed pawl | Drive pawl | One-way clutch |
|---|---|---|---|---|---|
| 1st | X | X | X | X | 1-2-3 |
| 2nd | X | X | ○ | X | 1-2-4 |
| 3rd | ○ | X | X | X | 1-3 |
| 4th | ○ | X | ○ | X | 1-4 |
| 5th | X | ○ | X | X | 1-3 |
| 6th | X | ○ | ○ | X | 1-4 |
| 7th | X | X | X | ○ | 2-3 |
| 8th | X | X | ○ | ○ | 2-4 |
| 9th | ○ | X | X | ○ | 3 |
| 10th | ○ | X | ○ | ○ | 4 |
| 11th | X | ○ | X | ○ | 3 |
| 12th | X | ○ | ○ | ○ | 4 |

Additionally, in the present invention, the drive unit 600 is provided to transfer the rotational force, which is input through the sprocket 200, to the shifting unit 400.

The driver 610 provided in the drive unit 600 is located on the open side of the hub shell 300 as shown in FIG. 9 and is provided with a cone nut 901 and a bearing 903 coupled to the shaft 100 so that the driver 610 is rotatably supported by the shaft 100.

In addition, the hub shell 300 and the drive unit 600 are provided to be independently rotatable by means of the bearing 905 located therebetween and a dust cover 310 shown in FIG. 8 prevents foreign substances from penetrating thereinto.

The bearings 903, 904, 905 have been illustrated as ball bearings by way of example, although they may be sliding bearings and thus there is no limitation on the kind thereof.

In particular, in the present invention, the occurrence of a displacement of the drive pawl clutch 620 in the axial direction of the shaft 100 according to the rotational manipulation of the shift lever causes a rotational force to be selectively transferred via the drive pawl 630 between the rotatable driver 610 and the non-rotatable drive pawl clutch 620, thereby achieving shifting.

In other words, in addition to the shifting of the shifting unit 400 described above, the rotational force input into the shifting unit 400 may also be subjected to the shifting in two stages according to whether the rotation of the drive pawl 630 is restricted by the drive pawl clutch 620.

And, the drive pawl clutch 620 is a component that is non-rotatable and just movable along the axial direction of the shaft 100, and can double the number of shifting stages with a compact configuration.

Accordingly, the drive unit 600 selectively transfers the rotational force from the drive unit 600 to the first-speed carrier 412 or the first-speed ring gear 411 of the first-speed planetary gear set 410 according to engagement or disengagement of the drive pawl clutch 620 and the drive pawl 630 so that the rotational force can be output in two stages and thus can be output at twelve shifting ratios in total.

In other words, in the present invention, an inclined contact surface 551 is formed in a predetermined interval of the joint ring 550, and the multi-stage transmission preferably includes the drive pawl clutch 620 located out of the connection ring 541 and having an inclined surface 621 formed in correspondence with the inclined contact surface 551, and unidirectional teeth 622 and a contact surface 623 formed at an outer peripheral surface of the drive pawl clutch; a rotation limiting ring 640 engaged with the drive pawl clutch 620 in the axial direction of the shaft 100 and having an inner peripheral surface engaged with the shaft 100, thereby causing the drive pawl clutch 620 to be non-rotatable but movable along the axial direction of the shaft 100; and the drive pawl 630 that is supported inside the driver 610 to be rotatable through a predetermined angle and revolves integrally with the driver 610, has an inner end revolving in contact with the contact surface 623 of the drive pawl clutch 620, wherein when an outer end of the drive pawl 630 is not engaged with teeth formed in an inner peripheral surface of the first-speed carrier 412 of the first-speed planetary gear set 410, or the inner end is engaged with the contact surface and the unidirectional teeth 622 of the drive pawl clutch 620 as the drive pawl clutch 620 moves to an intermediate position in the axial direction, the inner end repeatedly comes into contact with peaks of the teeth or valleys of the teeth due to the revolution of the driver 610, so that the outer end is repeatedly forcibly engaged with and disengaged from the inner peripheral surface of the first-speed carrier 412 of the first-speed planetary gear set 410, and wherein when the inner end is disengaged from the contact surface 623 and the unidirectional teeth 622 of the drive pawl clutch 620 as the drive pawl clutch 620 moves to an end position along the axial direction, the outer end is engaged with the teeth formed in the inner peripheral surface of the first-speed carrier 412 of the first-speed planetary gear set 410 so that the driver 610 and the first-speed carrier 412 are directly coupled to each other and rotate integrally.

Accordingly, the drive pawl clutch 620 and the rotation limiting ring 640 may have the function of a second forced return means.

As for the inclined contact surface 551, there are two inclined contact surfaces formed in the joint ring 550 with a phase angle difference of 180 degrees.

In addition, the drive pawl clutch 620 located out of the connection ring 541 has the inclined surface 621 formed on one side thereof, so that when the joint ring 550 rotates to cause the inclined contact surface 551 to be in contact with the inclined surface 621, the drive pawl clutch 620 is moved to the right in FIG. 14.

And, a spring 580 is connected between the angle control ring 542 and the drive pawl clutch 620, as shown in FIG. 20.

This drive pawl clutch 620 is not rotatable by being engaged with the rotation limiting ring 640. A spring 570 is provided between the drive pawl clutch 620 and the rotation limiting ring 640 as shown in FIG. 20 to elastically maintain a gap between them.

In other words, the spring 570 elastically support the drive pawl clutch 620 to move to the left in the figure and thus the drive pawl clutch 620 that has been moved to the right may be returned by the spring 570.

In addition, an elastic body (not shown) is provided at the drive pawl 630 to elastically support the drive pawl 630 such that the drive pawl rotates in one direction. When the drive pawl 630 rotates together with the drive unit 600, the inner end of the drive pawl 630 is kept to be in contact with the contact surface 623 of the drive pawl clutch 620 as shown in FIG. 15.

However, when the inner end of the rotating drive pawl 630 enters between the unidirectional teeth 622 according to the axial movement of the drive pawl clutch 620 as shown in FIG. 14, the drive pawl 630 rotates while its outer end is engaged with the inner gear formed in the inner peripheral surface of the first-speed carrier 412, thereby causing the driver 610 and the first-speed carrier 412 to be directly coupled to each other by the drive pawl 630 and to be rotated integrally.

Therefore, the rotational force that has been transferred via the driver 610→the first one-way clutch 910→the first-speed ring gear 411→the first-speed planetary gear 411→the first-speed carrier 412 is directly transferred from the driver 610 to the first-speed carrier 412 through the drive pawl 630 so that the rotational force may be transferred faster. Therefore, the drive unit 600 performs shifting in two stages by itself, thereby implementing twelve shifting stages in total together with six shifting stages configured by three planetary gear sets.

Here, in order to cause the aforementioned shifting to be produced after the shift lever is rotated by a predetermined angle, a groove is formed at the angle control ring 542 in a predetermined angle range and a protrusion formed on the joint ring 550 is to be located in the groove.

And, a plate ring 611 is provided within the driver 610 with a predetermined gap therebetween to rotate integrally therewith, and the drive pawl 630 is rotatably supported by the plate ring 611.

In other words, the plate ring 611 may be separately provided so that the drive pawl 630 is located in place at a predetermined position.

In particular, it is most preferable that the multi-stage transmission of the present invention further includes a first forced return means 700 capable of selectively controlling the pawls in engaged states into forced disengaged states and a second forced return means consisting of the drive pawl clutch 620 and the rotation limiting ring 640 and capable of selectively controlling the drive pawl 630 into a forced disengaged state, by using the rotational force input into the sprocket 200 according to conditions of rotational manipulation of the shift lever and the engagement of the pawls. This advantageously enables smoother shifting.

In the present invention, it is most preferable that the first forced return means 700 includes a forward rotating body 710 stacked on and coupled to one side of the plate ring 611 to rotate integrally therewith and having a ratchet 711 formed in an inner peripheral surface thereof; a reverse rotating body 720 having teeth formed in an outer peripheral surface on one side thereof and a ratchet 721 formed in an inner peripheral surface on the other side, wherein the reverse rotating body is rotated while the teeth are engaged with the larger-diameter portion of the first-speed planetary gear 413 configured in two stages and provided in the first-speed planetary gear set 410; an upper protrusion 731 and a lower protrusion 732 formed to protrude integrally from a back side of the joint ring 550; an arcuate cover 740 formed to protrude from an upper portion of the back side of the joint ring 550; a forced return ring 750 located on a side of the joint ring 550 and having an upper recess 751 and a lower recess 752 formed to accommodate the upper protrusion 731 and the lower protrusion 732 with a predetermined gap therebetween, respectively, wherein the lower protrusion 732 is elastically located at the center of the lower recess 752 by means of an elasticity adjusting bolt 753, a compression spring 754 and a delivery pin 756 in close contact with a lower recess protrusion 755 up to a predetermined location by receiving an elastic force from the compression spring 754, and wherein the forced return ring 750 is coupled to the engagement ring 560 so as to transfer a manipulation force; a forward pawl 760 and a reverse pawl 770 provided on both sides of the forced return ring 750 to be engaged with the ratchet 711 of the forward rotating body 710 and the ratchet 721 of the reverse rotating body 720, respectively, so that the engagement thereof is selectively limited by the cover 740; and an elastic body for elastically raising the forward pawl 760 and the reverse pawl 770.

In other words, the forward rotating body 710 always rotating in a forward direction is provided at the right of the forced return ring 750 as shown in FIG. 17, and the reverse rotating body 720 always rotating in a reserve direction is provided at the left of the forced return ring 750 as shown in FIG. 16.

Upon manipulation of shifting under these circumstances, if a relevant pawl is so strongly engaged with the inner teeth formed in the inner peripheral surface of the sun gear that the pawl cannot come out from the inner teeth and thus shifting is not achieved even though the joint ring 550 has been rotated, play of the upper protrusion 731 and the lower protrusion 732 shown in FIG. 17 is occurred within the upper recess 751 and the lower recess 752 shown in FIG. 11 so that a predetermined phase angle difference is generated between the joint ring 550 and the forced return ring 750.

In this case, the forward pawl 760 or reverse pawl 770 provided at the forced return ring 750 is released from the cover 740 of the joint ring 550 and elastically spread out by the elastic body and then engaged with the ratchet 711 or 722 of the forward rotating body 710 or reverse rotating body 720 located on the outside thereof. Therefore, the rotational force subjected to the shifting is transferred to the forced return ring 750 so as to enable shifting that has not been achieved by the shift lever manipulation force to be forcibly performed.

At this time, the forced return ring 750 is located between the forward rotating body 710 and the reverse rotating body 720 so that it can be manipulated in both the forward and reverse directions. When shifting manipulation is performed in the forward direction, i.e., acceleration manipulation is performed, the forward pawl 760 is engaged with the ratchet 711 of the forward rotating body 710, as shown in FIG. 17.

On the contrary, when the shifting manipulation is performed in the reserve direction, i.e., deceleration manipulation is performed, the reverse pawl 770 is engaged with the ratchet 721 of the reverse rotating body 720, as shown in FIG. 16.

Here, delivery pins 756 in contact with the lower recess protrusion 755 as shown in FIG. 11 are provided on both sides of the lower recess 752 of the forced return ring 750 so that the lower protrusion 732 is located at a middle point between the both ends. Each of the delivery pins 756 is elastically supported by the compression spring 754, and the compression spring 754 is again connected to the elasticity adjusting bolt 753. Therefore, the elastic force of the compression spring 754 may also be adjusted by tightening or loosening the elasticity adjusting bolt 753.

Accordingly, except for the shifting manipulation, the first forced return means 700 can be located at the center of the joint ring 550.

Additionally, it is preferred that gap maintaining rings 810 and 820 are provided to be fixed to the shaft 100 and positioned between the second-speed first sun gear 424 and the second-speed second sun gear 425 and between the second-speed second sun gear 425 and the third-speed sun gear 434, respectively, to cause the second-speed carrier 422, the third-speed carrier 432, the second-speed first sun gear 424, the second-speed second sun gear 425 and the third-speed sun gear 434 to rotate about the axis of the shaft 100 with a gap maintained in the axial direction with respect to the shaft 100. This enables the second-speed first sun gear 424 the second-speed second sun gear 425 and the third-speed sun gear 434 to rotate in place without rocking.

Hereinafter, operations of the multi-stage transmission of the present invention will be described with reference to the drawings to distinguish a first stage to a twelfth stage from one another.

First Stage

The first stage is a state where the shift lever is not manipulated and thus no pawl is engaged with the sun gear as shown in FIG. 19.

In this state, when a driving force is transferred through the sprocket 200, the driver 610 is rotated.

At this time, the drive pawl 630 provided in the drive unit 600 is only rotated in contact with the contact surface 623 of the drive pawl clutch 620, and the drive pawl 630 does not transfer the rotational force of the drive unit 600 directly to the first-speed carrier 412 of the first-speed planetary gear set 410.

Accordingly, the rotational force of the driver 610 is transferred to the first-speed ring gear 411 of the first-speed planetary gear set 410 through the first one-way clutch 910 provided in the drive unit 600, and the first-speed planetary gear 413 is rotated about the fixed first-speed sun gear 414. Therefore, the first-speed carrier 412 rotates integrally with the second-speed carrier 422 of the second-speed planetary gear set 420.

At this time, since all of the second-speed first sun gear 424 and the second-speed second sun gear 425 provided in the second-speed planetary gear set 420 are in a rotatable state, the rotation of the second-speed carrier 422 is transferred to the second-speed ring gear 421 through the second one-way clutch 920.

Accordingly, the third-speed carrier 432 of the third-speed planetary gear set 430 is rotated together with the second-speed ring gear 421. But, since the third-speed sun gear 434 is in a rotatable state, the third-speed planetary gear 433 does not transfer the rotational force.

Therefore, the rotational force of the second-speed ring gear 421 is transferred to the inner peripheral surface of the hub shell 300 through the third one-way clutch 930, thereby making an output.

Second Stage

The second stage is a state where the shift lever is manipulated such that the second-speed control ring 510 and the third-speed control ring 520 are rotated by about 15 degrees as shown in FIG. 19 and only the third-speed pawl 503 is engaged with the third-speed sun gear 434 and restricts the rotation of the third-speed sun gear 434.

The process of transferring the rotational force via the sprocket 200→the driver 610→the first one-way clutch 910→the first-speed ring gear 411→the first-speed planetary gear 413→the first-speed carrier 412→the second-speed carrier 422→the second one-way clutch 920→the second-speed ring gear 421 is identical to that of the first stage.

Thereafter, the rotational force of the second-speed ring gear 421 is transferred to the third-speed carrier 432. Here, since the rotation of the third-speed sun gear 434 is restricted by the third-speed pawl 503, the third-speed planetary gear 433 rotates and causes the third-speed ring gear 431 to be rotated faster than in the first stage.

Therefore, the rotation of the third-speed ring gear 431 is transferred to the inner peripheral surface of the hub shell 300 through the fourth one-way clutch 940, thereby making an output, and at this time, the third one-way clutch 930 is idle.

Third Stage

The third stage is a state where the shift lever is manipulated such that the second-speed control ring 510 and the third-speed control ring 520 are further rotated by about 15 degrees as shown in FIG. 19 and only the second-speed first pawl 501 is engaged with the second-speed first sun gear 424 and restricts the rotation of the second-speed first sun gear 424.

The process of transferring the rotational force via the sprocket 200→the driver 610→the first one-way clutch 910→the first-speed ring gear 411→the first-speed planetary gear 413→the first-speed carrier 412→the second-speed carrier 422 is identical to that of the second stage.

However, since only the rotation of the second-speed first sun gear 424 provided in the second-speed planetary gear set 420 is restricted, the rotation of the second-speed carrier 422 causes the larger-diameter portion of the second-speed planetary gear 423 configured in two stages to be engaged with the second-speed first sun gear 424, so that the second-speed ring gear 421 is rotated faster than in the second stage.

Even in this case, the third-speed carrier 432 of the third-speed planetary gear set 430 is also rotated together with the second-speed ring gear 421. However, since the third-speed sun gear 434 is in a rotatable state, the third-speed planetary gear 433 does not transfer the rotational force.

Therefore, the rotational force of the second-speed ring gear 421 is transferred to the inner peripheral surface of the hub shell 300 through the third one-way clutch 930, thereby making an output.

Now, assume that in the shifting from the second stage to the third stage as described above, the third-speed pawl 503 which has been engaged with the third-speed sun gear 434 in the second stage does not come out therefrom and thus smooth shifting is not achieved.

In this case, the joint ring 550 is rotated by 15 degrees in the counterclockwise direction, whereas the forced return ring 750 is not rotated. Accordingly, the reverse pawl 770 is released from the cover 740 of the joint ring 550 and then engaged with the ratchet 721 of the reverse rotating body 720 that is rotating in the counterclockwise direction.

Accordingly, a strong rotational force is transferred to the forced return ring 750 in the counterclockwise direction, while the third-speed pawl 503 that has been engaged with the inner teeth of the third-speed sun gear 434 comes out, thereby achieving shifting to the third stage.

On the contrary, assume that when shifting is performed from the fourth stage to the third stage, the third-speed pawl 503 which has been engaged with the third-speed sun gear 434 in the fourth stage does not come out therefrom and thus smooth shifting is not achieved.

In this case, the joint ring 550 is rotated by 15 degrees in the clockwise direction, whereas the forced return ring 750 is not rotated. Accordingly, the forward pawl 760 is released from the cover 740 of the joint ring 550 and then engaged with the ratchet 711 of the forward rotating body 710 that is rotating in the clockwise direction.

Accordingly, a strong rotational force is transferred to the forced return ring 750 in the clockwise direction, while the third-speed pawl 503 that has been engaged with the inner teeth of the third-speed sun gear 434 comes out, thereby achieving shifting to the third stage.

Fourth Stage

The fourth stage is a state where the shift lever is manipulated such that the second-speed control ring 510 and the third-speed control ring 520 are further rotated by about 15 degrees as shown in FIG. 19 and the second-speed first pawl 501 and the third-speed pawl 503 are engaged with the second-speed first sun gear 424 and the third-speed sun gear 434, respectively, and restrict the rotation of the second-speed first sun gear 424 and the third-speed sun gear 434.

The process of transferring the rotational force via the sprocket 200→the driver 610→the first one-way clutch 910→the first-speed ring gear 411→the first-speed planetary gear 413→the first-speed carrier 412→the second-speed carrier 422→the larger-diameter portion of the two-stage second-speed planetary gear 423→the second-speed ring gear 421 is identical to that of the third stage.

Thereafter, the rotational force of the second-speed ring gear 421 is transferred to the third-speed carrier 432. At this time, since the rotation of the third-speed sun gear 434 is restricted by the third-speed pawl 503, the third-speed planetary gear 433 rotates and causes the third-speed ring gear 431 to be rotated faster than in the third stage.

Therefore, the rotation of the third-speed ring gear 431 is transferred to the inner peripheral surface of the hub shell 300 through the fourth one-way clutch 940, thereby making an output. At this time, the third one-way clutch 930 is idle.

As described above, if in the shifting from the third stage to the fourth stage, the second-speed first pawl 501 which has been engaged with the second-speed first sun gear 424 in the third stage does not come out therefrom and thus smooth shifting is not achieved, or if in the shifting from the fifth stage to the fourth stage, the second-speed second pawl 502 which has been engaged with the second-speed second sun gear 425 in the fifth stage does not come out therefrom and thus smooth shifting is not achieved, the first forced return means 700 causes smooth shifting to be achieved as described above. Since the same forced return operation is also applied to the following shifting, a repetitive description thereof will be omitted below.

Fifth Stage

The fifth stage is a state where the shift lever is manipulated such that the second-speed control ring 510 and the third-speed control ring 520 are further rotated by about 15 degrees as shown in FIG. 19 and only the second-speed second pawl 502 is engaged with the second-speed second sun gear 425 and restricts the rotation of the second-speed second sun gear 425.

The process of transferring the rotational force via the sprocket 200→the driver 610→the first one-way clutch 910→the first-speed ring gear 411→the first-speed planetary gear 413→the first-speed carrier 412→the second-speed carrier 422 is identical to that of the fourth stage.

However since the rotation of the second-speed second sun gear 425 provided in the second-speed planetary gear set 420 is restricted, the rotation of the second-speed carrier 422 causes the smaller-diameter portion of the second-speed planetary gear 423 configured in two stages to be engaged with the second-speed second sun gear 425 thereby causing the second-speed ring gear 421 to be rotated faster than in the fourth stage.

Even at this time, the third-speed carrier 432 of the third-speed planetary gear set 430 is rotated together with the second-speed ring gear 421. However, since the third-speed sun gear 434 is in a rotatable state, the third-speed planetary gear 433 does not transfer the rotational force.

Therefore, the rotational force of the second-speed ring gear 421 is transferred to the inner peripheral surface of the hub shell 300 through the third one-way clutch 930, thereby making an output.

Sixth Stage

The sixth stage is a state where the shift lever is manipulated such that the second-speed control ring 510 and the third-speed control ring 520 are further rotated by about 15 degrees as shown in FIG. 19 and the second-speed second pawl 502 and the third-speed pawl 503 are engaged with the second-speed second sun gear 425 and the third-speed sun gear 434 respectively, and restrict the rotation of the second-speed second sun gear 425 and the third-speed sun gear 434.

The process of transferring the rotational force via the sprocket 200→the driver 610→the first one-way clutch 910→the first-speed ring gear 411→the first-speed planetary gear 413→the first-speed carrier 412→the second-speed carrier 422→the smaller-diameter portion of the two-stage second-speed planetary gear 423→the second-speed ring gear 421 is identical to that of the fifth stage.

Thereafter, the rotational force of the second-speed ring gear 421 is transferred to the third-speed carrier 432. At this time, since the rotation of the third-speed sun gear 434 is restricted by the third-speed pawl 503, the rotation of the third-speed planetary gear 433 rotates and causes the third-speed ring gear 431 to be rotated faster than in the fifth stage.

Therefore, the rotation of the third-speed ring gear 431 is transferred to the inner peripheral surface of the hub shell 300 through the fourth one-way clutch 940, thereby making an output. At this time, the third one-way clutch 930 is idle.

Seventh Stage

The seventh stage is a state where the shift lever is manipulated such that the second-speed control ring 510 and the third-speed control ring 520 are further rotated by about 15 degrees as shown in FIG. 19 and no pawl is engaged with the sun gear.

However, at the joint ring 550 whose rotation angle is gradually increased according to the manipulation of the shift lever, the inclined surface 621 of the drive pawl clutch 620 is brought into contact with the inclined contact surface 551, so that the drive pawl clutch 620 moves to the right in the figure.

In this state, when the driving force is transferred through the sprocket 200, the driver 610 is rotated.

At this time, the drive pawl 630 provided in the drive unit 600 is located, past the contact surface 623 of the drive pawl clutch 620, at a place where the unidirectional teeth 622 are formed and is pivotable through a predetermined angle.

Therefore, the inner end of the drive pawl 630 is interposed between the unidirectional teeth 622, and the outer end thereof is engaged with the inner teeth formed in the inner peripheral surface of the first-speed carrier 412.

Accordingly, switching is made to cause the drive pawl 630 to transfer the rotational force of the drive unit 600 directly to the first-speed carrier 412 of the first-speed planetary gear set 410.

Therefore, the rotational force of the driver 610 is transferred directly to the first-speed carrier 412 of the first-speed planetary gear set 410 through the drive pawl 630, and the first-speed carrier 412 is rotated integrally with the second-speed carrier 422 of the second-speed planetary gear set 420.

At this time, since both the second-speed first sun gear 424 and the second-speed second sun gear 425 provided in the second-speed planetary gear set 420 are in a rotatable state, the rotation of the second-speed carrier 422 is transferred to the second-speed ring gear 421 through the second one-way clutch 920.

Accordingly, although the third-speed carrier 432 of the third-speed planetary gear set 430 is rotated together with the second-speed ring gear 421, the third-speed sun gear 434 is a rotatable state and thus the third-speed planetary gear 433 does not transfer the rotational force.

Therefore, the rotational force of the second-speed ring gear 421 is transferred to the inner peripheral surface of the hub shell 300 through the third one-way clutch 930, thereby making an output.

At this time, the drive pawl clutch 620 and the rotation limiting ring 640 corresponding to the second forced return means forcibly controls the drive pawl 630 in such a manner that when the inner end of the drive pawl 630 is engaged with the contact surface of the drive pawl clutch 620 and the unidirectional teeth 622 the revolution of the driver 610 causes the inner end to repeatedly come into contact with the peaks or valleys of the teeth so that the engagement and disengagement of the outer end with and from the inner peripheral surface of the first-speed carrier 412 of the first-speed planetary gear set 410 are forcibly repeated.

Eighth to Twelfth Stages

The eighth to twelfth stages are states where the shift lever is manipulated such that the second-speed control ring 510 and the third-speed control ring 520 are further rotated by about 15 degrees at every stage as shown in FIG. 19. These states are substantially identical to the second to sixth stages, except for the process of transferring the rotational force via the sprocket 200→the driver 610→the drive pawl 630→the first-speed carrier 412→the second-speed carrier 422→the second one-way clutch 920→the second-speed ring gear 421.

Therefore, the multi-stage transmission of the present invention has superior advantages in that a compact multi-stage transmission can be configured using a plurality of planetary gear sets so as to improve product marketability; the number of shifting stages implemented by the planetary gear sets can be doubled by changing a transfer path of a rotational force through the configuration in which a displacement is produced in the axial direction of the shaft 100 according to the manipulation of the shift lever; and use convenience of a user can be maximized by achieving smooth shifting in both a forward operation by acceleration manipulation and a reverse operation by deceleration manipulation using the forced return means.

The above embodiment is merely an example for better understanding of the technical spirit of the present invention, and the scope of the present invention is not limited to the embodiments or drawings.

DESCRIPTION OF REFERENCE NUMERALS

| | |
|---|---|
| 100: shaft | 101, 102, 103: pawl seating portion |
| 200: sprocket | 300: hub shell |
| 310: dust cover | 400: shifting unit |
| 410: first-speed planetary gear set | 411: first-speed ring gear |
| 412: first-speed carrier | 413: first-speed planetary gear |
| 414: first-speed sun gear | 420: second-speed planetary gear set |
| 421: second-speed ring gear | 422: second-speed carrier |
| 423: second-speed planetary gear | 424: second-speed first sun gear |
| 425: second-speed second sun gear | 430: third-speed planetary gear set |
| 431: third-speed ring gear | 432: third-speed carrier |
| 433: third-speed planetary gear | 434: third-speed sun gear |
| 500: control unit | 501: second-speed first pawl |
| 502: second-speed second pawl | 503: third-speed pawl |
| 510: second-speed control ring | 520: third-speed control ring |
| 530: cable ring | 531: outer cable ring |
| 532: inner cable ring | 541: connection ring |
| 542: angle control ring | 550: joint ring |
| 551: inclined contact surface | 560: engagement ring |
| 600: drive unit | 610: driver |
| 611: plate ring | 620: drive pawl clutch |
| 621: inclined surface | 622: unidirectional teeth |
| 623: contact surface | 630: drive pawl |
| 640: rotation limiting ring | 700: first forced return means |
| 710: forward rotating body | 711: ratchet |
| 720: reverse rotating body | 721: ratchet |
| 731: upper protrusion | 732: lower protrusion |
| 740: cover | 750: forced return ring |
| 751: upper recess | 752: lower recess |
| 753: elasticity adjusting bolt | 754: compression spring |
| 755: lower recess protrusion | 756: delivery pin |
| 760: forward pawl | 770: reverse pawl |
| 810, 820: gap maintaining ring | 901, 902: cone nut |
| 903, 904, 905: bearing | 910: first one-way clutch |
| 920: second one-way clutch | 930: third one-way clutch |
| 940: fourth one-way clutch | |

The invention claimed is:

1. A multi-stage transmission comprising:
a shaft (100) with both ends fixed, and a sprocket (200) for receiving a rotational force and a hub shell (300) for outputting the rotational force, the sprocket (200) and the hub shell (300) being rotatably located on an outer periphery of the shaft (100);
a shifting unit (400) comprising one-way clutches and planetary gear sets, each of planetary gear sets being composed of a sun gear, planetary gears, a carrier and a ring gear provided within the hub shell (300) to change the rotational force input through the sprocket (200) and to output the changed rotational force to the hub shell (300); and
a control unit (500) for controlling shifting by controlling pawls provided on the shaft (100) according to manipulation of a shift lever to selectively restrict rotation of the sun gear,
wherein the manipulation for rotating the shift lever generates a displacement of a drive pawl clutch (620) in an axial direction of the shaft (100), so that the rotational force is selectively transferred with intervention of drive pawls (630) between a rotatable driver (610) and the non-rotatable drive pawl clutch (620), thereby achieving the shifting.

2. A multi-stage transmission comprising:
a shaft (100) with both ends fixed, and a sprocket (200) for receiving a rotational force and a hub shell (300) for outputting the rotational force, the sprocket (200) and the hub shell (300) being rotatably located on an outer periphery of the shaft (100);
a shifting unit (400) comprising one-way clutches and planetary gear sets, each of planetary gear sets being composed of a sun gear, planetary gears, a carrier and a ring gear provided within the hub shell (300) to change the rotational force input through the sprocket (200) and to output the changed rotational force to the hub shell (300); and
a control unit (500) for controlling shifting by controlling pawls provided on the shaft (100) according to manipulation of a shift lever to selectively restrict rotation of the sun gear,
wherein the multi-stage transmission further comprises:
a first forced return means (700) capable of selectively controlling the pawls in engaged states into forced disengaged states and a second forced return means consisting of a drive pawl clutch (620) and a rotation limiting ring (640) and capable of selectively controlling a drive pawl (630) into a forced disengaged state, by using the rotational force input into the sprocket (200) according to conditions of rotational manipulation of the shift lever and the engagement of the pawls.

3. The multi-stage transmission according to claim 1, wherein:
the shifting unit (400) comprises a first-speed planetary gear set (410), a second-speed planetary gear set (420) and a third-speed planetary gear set (430) and transfers the rotational force, which is transmitted from a drive unit (600) to a first-speed carrier (412) or a first-speed ring gear (411), to a second-speed carrier (422) via the first-speed planetary gear set (410); and the rotational force transferred to the second-speed carrier (422) can be changed in six stages through the second-speed planetary gear set (420) and the third-speed planetary gear set (430), and the changed rotational force can be output to the hub shell (300).

4. The multi-stage transmission according to claim 3, wherein:
the drive unit (600) selectively transfers the rotational force from the drive unit (600) to the first-speed carrier (412) or the first-speed ring gear (411) of the first-speed planetary gear set (410) according to engagement or disengagement of the drive pawl clutch (620) and the drive pawl (630), so that the rotational force can be output in two stages and thus can be output at twelve shifting ratios in total.

5. The multi-stage transmission according to claim 4, wherein:
a second-speed control ring (510) and a third-speed control ring (520) that are rotated in an interlocked manner according to the rotation of the shift lever are stacked along the axial direction of the shaft (100) and on outer peripheries of a second-speed first pawl (501), a second-speed second pawl (502) and a third-speed pawl (503);
grooves are formed in an inner peripheral surface of the second-speed control ring (510) so that the second-speed first pawl (501) and the second-speed second pawl (502) can selectively come into the grooves according to the rotation of the second-speed control ring (510); and
grooves are formed in an inner peripheral surface of the third-speed control ring (520) so that the third-speed pawl (503) can selectively come into the grooves according to the rotation of the third-speed control ring (520).

6. The multi-stage transmission according to claim 5, wherein:

a plurality of grooves are formed in the second-speed control ring (510) about a central axis of the shaft (100) in pairs corresponding to the second-speed first pawl (501) and the second-speed second pawl 502; and a plurality of grooves are formed in the third-speed control ring (520) about the central axis of the shaft (100) corresponding to the third-speed pawl (503).

7. The multi-stage transmission according to claim 6, wherein the control unit (500) comprises:

a cable ring (530) rotatably supported on the outer peripheral surface of the shaft (100) and having a cable connected thereto that is withdrawn according to the manipulation of the shift lever;

a joint ring (550) for receiving a manipulation force elastically through a spring via a connection ring (541) connected to the cable ring (530) and an angle control ring (542) fitted into and operated integrally with the connection ring (541); and an engagement ring (560) engaged and rotated integrally with the joint ring (550) and coupled to the third-speed control ring (520) so as to rotate the second-speed control ring (510) and the third-speed control ring (520).

8. The multi-stage transmission according to claim 7, wherein:

an inclined contact surface (551) is formed in a predetermined interval of the joint ring (550), and the multi-stage transmission further comprises:

the drive pawl clutch (620) located out of the connection ring (541) and having an inclined surface (621) formed in correspondence with the inclined contact surface (551), and unidirectional teeth (622) and a contact surface (623) formed at an outer peripheral surface of the drive pawl clutch;

a rotation limiting ring (640) engaged with the drive pawl clutch (620) in the axial direction of the shaft (100) and having an inner peripheral surface engaged with the shaft (100), thereby causing the drive pawl clutch (620) to be non-rotatable but movable along the axial direction of the shaft (100); and the drive pawl (630) supported inside the driver (610) to be rotatable through a predetermined angle and revolves integrally with the driver (610), the drive pawl having an inner end revolving in contact with the contact surface (623) of the drive pawl clutch (620), wherein when an outer end of the drive pawl is not engaged with teeth formed in an inner peripheral surface of the first-speed carrier (412) of the first-speed planetary gear set (410), or the inner end is engaged with the contact surface and the unidirectional teeth (622) of the drive pawl clutch (620) as the drive pawl clutch (620) moves to an intermediate position in the axial direction, the inner end repeatedly comes into contact with peaks of the teeth or valleys of the teeth due to the revolution of the driver (610), so that the outer end is repeatedly forcibly engaged with and disengaged from the inner peripheral surface of the first-speed carrier (412) of the first-speed planetary gear set (410), and wherein when the inner end is disengaged from the contact surface (623) and the unidirectional teeth (622) of the drive pawl clutch (620) as the drive pawl clutch (620) moves to an end position along the axial direction, the outer end is engaged with the teeth formed in the inner peripheral surface of the first-speed carrier (412) of the first-speed planetary gear set (410) so that the driver (610) and the first-speed carrier (412) are directly coupled to each other and rotate integrally.

9. The multi-stage transmission according to claim 8, wherein the first forced return means (700) comprises:

a forward rotating body (710) stacked on and coupled to one side of a plate ring (611) to rotate integrally therewith and having a ratchet (711) formed in an inner peripheral surface thereof;

a reverse rotating body (720) having teeth formed in an outer peripheral surface on one side thereof and a ratchet (721) formed in an inner peripheral surface on the other side, the reverse rotating body being rotated while the teeth are engaged with the larger-diameter portion of the first-speed planetary gear (413) configured in two stages and provided in the first-speed planetary gear set (410);

an upper protrusion (731) and a lower protrusion (732) formed to protrude integrally from a back side of the joint ring (550);

an arcuate cover (740) formed to protrude from an upper portion of the back side of the joint ring (550);

a forced return ring (750) located on a side of the joint ring (550) and having an upper recess (751) and a lower recess (752) formed to accommodate the upper protrusion (731) and the lower protrusion (732) with a predetermined gap therebetween, respectively, wherein the lower protrusion (732) is elastically located at the center of the lower recess (752) by means of an elasticity adjusting bolt (753), a compression spring (754) and a delivery pin (756) in close contact with a lower recess protrusion (755) up to a predetermined location by receiving an elastic force from the compression spring (754), and wherein the forced return ring (750) is coupled to the engagement ring (560) so as to transfer a manipulation force;

a forward pawl (760) and a reverse pawl (770) provided on both sides of the forced return ring (750) to be engaged with the ratchet (711) of the forward rotating body (710) and the ratchet (721) of the reverse rotating body (720), respectively, so that the engagement thereof is selectively limited by the cover (740); and an elastic body for elastically raising the forward pawl (760) and the reverse pawl (770).

10. The multi-stage transmission according to claim 9, wherein:

gap maintaining rings (810 and 820) are provided to be fixed to the shaft (100) and positioned between the second-speed first sun gear (424) and the second-speed second sun gear (425) and between the second-speed second sun gear (425) and the third-speed sun gear (434), respectively, to cause the second-speed carrier (422), the third-speed carrier (432), the second-speed first sun gear (424), the second-speed second sun gear (425) and the third-speed sun gear (434) to rotate about the axis of the shaft with a gap maintained in the axial direction with respect to the shaft (100).

11. The multi-stage transmission according to claim 2, wherein:

the shifting unit (400) comprises a first-speed planetary gear set (410), a second-speed planetary gear set (420) and a third-speed planetary gear set (430) and transfers the rotational force, which is transmitted from a drive unit (600) to a first-speed carrier (412) or a first-speed ring gear (411), to a second-speed carrier (422) via the first-speed planetary gear set (410); and the rotational force transferred to the second-speed carrier (422) can be changed in six stages through the second-speed planetary gear set (420) and the third-speed planetary gear set (430), and the changed rotational force can be output to the hub shell (300).

12. The multi-stage transmission according to claim 11, wherein:
the drive unit (600) selectively transfers the rotational force from the drive unit (600) to the first-speed carrier (412) or the first-speed ring gear (411) of the first-speed planetary gear set (410) according to engagement or disengagement of the drive pawl clutch (620) and the drive pawl (630), so that the rotational force can be output in two stages and thus can be output at twelve shifting ratios in total.

13. The multi-stage transmission according to claim 12, wherein:
a second-speed control ring (510) and a third-speed control ring (520) that are rotated in an interlocked manner according to the rotation of the shift lever are stacked along the axial direction of the shaft (100) and on outer peripheries of a second-speed first pawl (501), a second-speed second pawl (502) and a third-speed pawl (503);
grooves are formed in an inner peripheral surface of the second-speed control ring (510) so that the second-speed first pawl (501) and the second-speed second pawl (502) can selectively come into the grooves according to the rotation of the second-speed control ring (510); and
grooves are formed in an inner peripheral surface of the third-speed control ring (520) so that the third-speed pawl (503) can selectively come into the grooves according to the rotation of the third-speed control ring (520).

14. The multi-stage transmission according to claim 13, wherein:
a plurality of grooves are formed in the second-speed control ring (510) about a central axis of the shaft (100) in pairs corresponding to the second-speed first pawl (501) and the second-speed second pawl 502; and
a plurality of grooves are formed in the third-speed control ring (520) about the central axis of the shaft (100) corresponding to the third-speed pawl (503).

15. The multi-stage transmission according to claim 14, wherein the control unit (500) comprises:
a cable ring (530) rotatably supported on the outer peripheral surface of the shaft (100) and having a cable connected thereto that is withdrawn according to the manipulation of the shift lever;
a joint ring (550) for receiving a manipulation force elastically through a spring via a connection ring (541) connected to the cable ring (530) and an angle control ring (542) fitted into and operated integrally with the connection ring (541); and
an engagement ring (560) engaged and rotated integrally with the joint ring (550) and coupled to the third-speed control ring (520) so as to rotate the second-speed control ring (510) and the third-speed control ring (520).

16. The multi-stage transmission according to claim 15, wherein:
an inclined contact surface (551) is formed in a predetermined interval of the joint ring (550), and
the multi-stage transmission further comprises:
the drive pawl clutch (620) located out of the connection ring (541) and having an inclined surface (621) formed in correspondence with the inclined contact surface (551), and unidirectional teeth (622) and a contact surface (623) formed at an outer peripheral surface of the drive pawl clutch;
a rotation limiting ring (640) engaged with the drive pawl clutch (620) in the axial direction of the shaft (100) and having an inner peripheral surface engaged with the shaft (100), thereby causing the drive pawl clutch (620) to be non-rotatable but movable along the axial direction of the shaft (100); and
the drive pawl (630) supported inside the driver (610) to be rotatable through a predetermined angle and revolves integrally with the driver (610), the drive pawl having an inner end revolving in contact with the contact surface (623) of the drive pawl clutch (620), wherein when an outer end of the drive pawl is not engaged with teeth formed in an inner peripheral surface of the first-speed carrier (412) of the first-speed planetary gear set (410), or the inner end is engaged with the contact surface and the unidirectional teeth (622) of the drive pawl clutch (620) as the drive pawl clutch (620) moves to an intermediate position in the axial direction, the inner end repeatedly comes into contact with peaks of the teeth or valleys of the teeth due to the revolution of the driver (610), so that the outer end is repeatedly forcibly engaged with and disengaged from the inner peripheral surface of the first-speed carrier (412) of the first-speed planetary gear set (410), and wherein when the inner end is disengaged from the contact surface (623) and the unidirectional teeth (622) of the drive pawl clutch (620) as the drive pawl clutch (620) moves to an end position along the axial direction, the outer end is engaged with the teeth formed in the inner peripheral surface of the first-speed carrier (412) of the first-speed planetary gear set (410) so that the driver (610) and the first-speed carrier (412) are directly coupled to each other and rotate integrally.

17. The multi-stage transmission according to claim 16, wherein, the first forced return means (700) comprises:
a forward rotating body (710) stacked on and coupled to one side of a plate ring (611) to rotate integrally therewith and having a ratchet (711) formed in an inner peripheral surface thereof;
a reverse rotating body (720) having teeth formed in an outer peripheral surface on one side thereof and a ratchet (721) formed in an inner peripheral surface on the other side, the reverse rotating body being rotated while the teeth are engaged with the larger diameter portion of the first-speed planetary gear (413) configured in two stages and provided in the first-speed planetary gear set (410);
an upper protrusion (731) and a lower protrusion (732) formed to protrude integrally from a back side of the joint ring (550);
an arcuate cover (740) formed to protrude from an upper portion of the back side of the joint ring (550);
a forced return ring (750) located on a side of the joint ring (550) and having an upper recess (751) and a lower recess (752) formed to accommodate the upper protrusion (731) and the lower protrusion (732) with a predetermined gap therebetween, respectively, wherein the lower protrusion (732) is elastically located at the center of the lower recess (752) by means of an elasticity adjusting bolt (753), a compression spring (754) and a delivery pin (756) in close contact with a lower recess protrusion (755) up to a predetermined location by receiving an elastic force from the compression spring (754), and wherein the forced return ring (750) is coupled to the engagement ring (560) so as to transfer a manipulation force;
a forward pawl (760) and a reverse pawl (770) provided on both sides of the forced return ring (750) to be engaged with the ratchet (711) of the forward rotating body (710) and the ratchet (721) of the reverse rotating body (720), respectively, so that the engagement thereof is selectively limited by the cover (740); and an elastic body for elastically raising the forward pawl (760) and the reverse pawl (770).

18. The multi-stage transmission according to claim 17, wherein:

gap maintaining rings (810 and 820) are provided to be fixed to the shaft (100) and positioned between the second-speed first sun gear (424) and the second-speed second sun gear (425) and between the second-speed second sun gear (425) and the third-speed sun gear (434), respectively, to cause the second-speed carrier (422), the third-speed carrier (432), the second-speed first sun gear (424), the second-speed second sun gear (425) and the third-speed sun gear (434) to rotate about the axis of the shaft with a gap maintained in the axial direction with respect to the shaft (100).

19. A multi-stage transmission comprising:

a shaft (100) with both ends fixed, and a sprocket (200) for receiving a rotational force and a hub shell (300) for outputting the rotational force, (200) and the hub shell (300) being rotatably located on an outer periphery of the shaft (100);

a shifting unit (400) comprising one-way clutches and planetary gear sets, each of planetary gear sets being composed of a sun planetary gears, a carrier and a ring gear provided within the hub shell (300) to change the rotational force input through the sprocket (200) and to output the changed rotational force to the hub shell (300); and a control unit (500) for controlling shifting by controlling pawls provided on the shaft (100) according to manipulation of a shift lever to selectively restrict rotation of the sun gear, wherein the control unit (500) has one or more control rings for controlling the pawls, the control rings being stacked in the axial direction of the shaft (100) to be rotated integrally, and one or more pawls are selectively controlled to be in an engaged state or disengaged state, thereby controlling shifting, wherein: the shifting unit (400) comprises a first-speed planetary gear set (410), a second-speed planetary gear set (420) and a third-speed planetary gear set (430) and transfers the rotational force, which is transmitted from a drive unit (600) to a first-speed carrier (412) or a first-speed ring gear (411), to a second-speed carrier (422) via the first-speed planetary gear set (410); and the rotational force transferred to the second-speed carrier (422) can be changed in six stages through the second-speed planetary gear set (420) and the third-speed planetary gear set (430), and the changed rotational force can be output to the hub shell (300).

20. The multi-stage transmission according to claim 19, wherein:

the drive unit (600) selectively transfers the rotational force from the drive unit (600) to the first-speed carrier (412) or the first-speed ring gear (411) of the first-speed planetary gear set (410) according to engagement or disengagement of the drive pawl clutch (620) and the drive pawl (630), so that the rotational force can be output in two stages and thus can be output at twelve shifting ratios in total.

21. The multi-stage transmission according to claim 20, wherein:

a second-speed control ring (510) and a third-speed control ring (520) that are rotated in an interlocked manner according to the rotation of the shift lever are stacked along the axial direction of the shaft (100) and on outer peripheries of a second-speed first pawl (501), a second-speed second pawl (502) and a third-speed pawl (503);

grooves are formed in an inner peripheral surface of the second-speed control ring (510) so that the second-speed first pawl (501) and the second-speed second pawl (502) can selectively come into the grooves according to the rotation of the second-speed control ring (510); and grooves are formed in an inner peripheral surface of the third-speed control ring (520) so that the third-speed pawl (503) can selectively come into the grooves according to the rotation of the third-speed control ring (520).

22. The multi-stage transmission according to claim 21, wherein:

a plurality of grooves are formed in the second-speed control ring (510) about a central axis of the shaft (100) in pairs corresponding to the second-speed first pawl (501) and the second-speed second pawl 502; and a plurality of grooves are formed in the third-speed control ring (520) about the central axis of the shaft (100) corresponding to the third-speed pawl (503).

23. The multi-stage transmission according to claim 22, wherein the control unit (500) comprises:

a cable ring (530) rotatably supported on the outer peripheral surface of the shaft (100) and having a cable connected thereto that is withdrawn according to the manipulation of the shift lever;

a joint ring (550) for receiving a manipulation force elastically through a spring via a connection ring (541) connected to the cable ring (530) and an angle control ring (542) fitted into and operated integrally with the connection ring (541); and an engagement ring (560) engaged and rotated integrally with the joint ring (550) and coupled to the third-speed control ring (520) so as to rotate the second-speed control ring (510) and the third-speed control ring (520).

24. The multi-stage transmission according to claim 23, wherein;

an inclined contact surface (551) is formed in a predetermined interval of the joint ring (550), and the multi-stage transmission further comprises:

a drive pawl clutch (620) located out of the connection ring (541) and having an inclined surface (621) formed in correspondence with the inclined contact surface (551), and unidirectional teeth (622) and a contact surface (623) formed at an outer peripheral surface of the drive pawl clutch;

a rotation limiting ring (640) engaged with the drive pawl clutch (620) in the axial direction of the shaft (100) and having an inner peripheral surface engaged with the shaft (100), thereby causing the drive pawl clutch (620) to be non-rotatable but movable along the axial direction of the shaft (100); and a drive pawl (630) supported inside the driver (610) to be rotatable through a predetermined angle and revolves integrally with the driver (610), the drive pawl having an inner end revolving in contact with the contact surface (623) of the drive pawl clutch (620), wherein when an outer end of the drive pawl is, not engaged with teeth formed in an inner peripheral surface of the first-speed carrier (412) of the first-speed planetary gear set (410), or the inner end is engaged with the contact surface and the unidirectional teeth (622) of the drive pawl clutch (620) as the drive pawl clutch (620) moves to an intermediate position in the axial direction, the inner end repeatedly comes into contact with peaks of the teeth or valleys of the teeth due to the revolution of the driver (610), so that the outer end is repeatedly forcibly engaged with and disengaged from the inner peripheral surface of the first-speed carrier (412) of the first-speed planetary gear set (410), and wherein when the inner end is disengaged from the contact surface (623) and the unidirectional teeth (622) of the drive pawl clutch (620) as the drive pawl clutch (620) moves to an end position along the axial direction, the outer end is engaged with the teeth formed in the inner peripheral surface of the first-speed carrier (412) of the first-speed planetary gear set (410) so that the driver (610) and the first-speed carrier (412) are directly coupled to each other and rotate integrally.

25. The multi-stage transmission according to claim 24, wherein the first forced return means (700) comprises:
    a forward rotating body (710) stacked on and coupled to one side of a plate ring (611) to rotate integrally therewith and having a ratchet (711) formed in an inner peripheral surface thereof;
    a reverse rotating body (720) having teeth formed in an outer peripheral surface on one side thereof and a ratchet (721) formed in an inner peripheral surface on the other side, the reverse rotating body being rotated while the teeth are engaged with the larger-diameter portion of the first-speed planetary gear (413) configured in two stages and provided in the first-speed planetary gear set (410);
    an upper protrusion (731) and a lower protrusion (732) formed to protrude integrally from a back side of the joint ring (550);
    an arcuate cover (740) formed to protrude from an upper portion of the back side of the joint ring (550);
    a forced return ring (750) located on a side of the joint ring (550) and having an upper recess (751) and a lower recess (752) formed to accommodate the upper protrusion (731) and the lower protrusion (732) with a predetermined gap therebetween, respectively, wherein the lower protrusion (732) is elastically located at the center of the lower recess (752) by means of an elasticity adjusting bolt (753), a compression spring (754) and a delivery pin (756) in close contact with a lower recess protrusion (755) up to a predetermined location by receiving an elastic force from the compression spring (754), and wherein the forced return ring (750) is coupled to the engagement ring (560) so as to transfer a manipulation force;
    a forward pawl (760) and a reverse pawl (770) provided on both sides of the forced return ring (750) to be engaged with the ratchet (711) of the forward rotating body (710) and the ratchet (721) of the reverse rotating body (720), respectively, so that the engagement thereof is selectively limited by the cover (740); and
    an elastic body for elastically raising the forward pawl (760) and the reverse pawl (770).

26. The multi-stage transmission according to claim 25, wherein:
    gap maintaining rings (810 and 820) are provided to be fixed to the shaft (100) and positioned between the second-speed first sun gear (424) and the second-speed second sun gear (425) and between the second-speed second sun gear (425) and the third-speed sun gear (434), respectively, to cause the second-speed carrier (422), the third-speed carrier (432), the second-speed first sun gear (424), the second-speed second sun gear (425) and the third-speed sun gear (434) to rotate about the axis of the shaft with a gap maintained in the axial direction with respect to the shaft (100).

\* \* \* \* \*